United States Patent [19]
Weres et al.

[11] Patent Number: 5,419,824
[45] Date of Patent: May 30, 1995

[54] ELECTRODE, ELECTRODE MANUFACTURING PROCESS AND ELECTROCHEMICAL CELL

[76] Inventors: Oleh Weres, P.O. Box 116, Vineburg, Calif. 95487; Michael R. Hoffmann, 1625 Laurel St., South Pasadena, Calif. 91030

[21] Appl. No.: 194,727

[22] Filed: Feb. 10, 1994

Related U.S. Application Data

[63] Continuation-in-part of Ser. No. 975,058, Nov. 12, 1992, abandoned.

[51] Int. Cl.⁶ .............................................. C25B 9/00
[52] U.S. Cl. .................................. 204/268; 204/242; 204/284; 204/290 F
[58] Field of Search ............... 204/284, 290 F, 242, 204/291, 268; 252/520; 429/41

[56] References Cited

U.S. PATENT DOCUMENTS

| | | | |
|---|---|---|---|
| 3,846,273 | 11/1974 | Bianchi et al. | 204/290 F |
| 4,326,943 | 4/1982 | Bänziger et al. | 204/284 |
| 4,422,917 | 12/1983 | Hayfield | 204/196 |
| 4,484,999 | 11/1984 | Asano et al. | 204/290 F |
| 4,738,763 | 4/1988 | Abrahamson et al. | 204/290 F |

*Primary Examiner*—Kathryn Gorgos
*Attorney, Agent, or Firm*—Harold D. Messner

[57] ABSTRACT

This invention provides a novel electrode which is capable of operation at sufficiently positive anodic potential to produce hydroxyl free radicals and release them into solution, and a process for producing these electrodes. It also provides electrochemical cells utilizing these electrodes, and a novel material included in these electrodes. The electrode consists of titanium metal or a titanium alloy, with an oxide coating that includes titanium dioxide and also includes niobium(IV) oxide or tantalum(IV) oxide, sufficient to impart adequate electrical conductivity to the titanium dioxide under the necessary anodic polarization. An electrode preparation process is described, which allows niobium or tantalum in the oxide coating to be reduced to the +4 valence state, and causes the coating to assume a very stable and insoluble crystal structure. A process for manufacturing ammonium niobate, which is the preferred source compound for niobium in the electrode manufacturing process, is also provided.

15 Claims, 11 Drawing Sheets

ELECTRODE, ELECTRODE MANUFACTURING PROCESS AND ELECTROCHEMICAL CELL

This application is a continuation-in-part of application Ser. No. 07/975,058, filed Nov. 12, 1992, titled "Electrode, Electrode Manufacturing Process and Electrochemical Cell", as is now abandoned.

REFERENCES CITED

| U.S. Pat. Documents | | |
| --- | --- | --- |
| 3,846,273 | 11/1974 | Bianchi et al. |
| 4,422,917 | 12/1983 | Hayfield |
| 4,484,999 | 11/1984 | Asano et al. |

Other Publications

T. G. Babich, A. V. Zagorodnyuk, G. A. Teterin, M. Ya. Khodos, and A. P. Zhirnova (1988) *Russian journal of inorganic chemistry*, v. 33, 560–563.

J. E. Graves, D. Pletcher, R. L. Clarke, and F. C. Walsh (1991) *J. Appl. Electrochemistry*, v. 21, 848–857, G. E. Guerchais, and R. Rohmer (1964) *Compt. Rend.* v. 259, 394–396.

G. E. Guerchais, and B. Spinner (1965) *Bull. Soc. Chim. France*, 58–61.

M. Ya. Khodos, G. M. Belysheva, and N. V. Krivosheev (1988) *Russian journal of inorganic chemistry*, v. 33, 604–606.

C. Kormann, D. W. Bahnemann, and M. R. Hoffmann (1991) *Envir. Sci. Technology*, v. 25, 494–500.

M. J. Madou, K. Kinoshita and M. C. H. McKubre (1984) *Electrochimica Acta*, v. 29, 419–423.

P. Salvador (1980) *Solar energy materials*, v. 2, 413–421.

BACKGROUND OF THE INVENTION

1. Field of Invention

This invention relates to electrodes, electrochemical cells incorporating said electrodes, compositions of matter related to said electrodes, a process for producing said electrodes, and a process for making a previously unavailable material needed to make said electrodes.

2. Related Patent Applications

A water purification device utilizing the electrodes described herein is provided in the related U.S. patent application Ser. No. 07/975,059, filed Nov. 12, 1992. The above identified related application also claims the use of these electrodes to produce hydroxyl free radical, and to degrade by oxidation chemical substances dissolved in water, and provides examples. The above identified related application is hereby incorporated by reference.

3. Discussion of Prior Art

The present invention provides an electrode that produces hydroxyl free radicals when it is polarized to a sufficiently large anodic potential. Hydroxyl radical is a very powerful, nonspecific oxidizing species which attacks most organic molecules. Hydroxyl is produced by irradiation of particles of titanium dioxide dispersed in water with ultraviolet light (Kormann and others 1991), and hydroxyl thus produced reacts with and degrades organic substances in solution. The photochemical process remains largely a laboratory curiosity, because sunlight includes only a small fraction of usable UV energy, and the photochemical process has a small quantum yield.

The present invention provides electrodes wherein the base metal is titanium or a titanium alloy, covered with a suitably doped coating of titanium dioxide. While titanium is used as a substrate for coated anodes in several applications, pure titanium dioxide has very low electrical conductivity. The anodic oxide layer spontaneously produced when titanium metal is anodically polarized does not make a useful electrode, because the current density is low to begin with, and decreases rapidly with time as the thickness of the oxide layer grows.

Titanium anodes are used in several applications wherein the titanium metal substrate is coated with an adherent layer of titanium dioxide which includes admixtures which increase its electrical conductivity. For example, titanium anodes coated with titanium dioxide layer that is doped with platinum group metals are commonly used in cathodic protection systems. Titanium anodes coated with titanium dioxide including a large fraction of ruthenium dioxide and other metal oxides (commonly tin dioxide) are used in the electrolytic production of chlorine. Aside from their large content of precious metals, these electrodes are ill-suited for generating hydroxyl for a fundamental electrochemical reason: other anodic reactions occur at potentials much less positive than the values required to generate hydroxyl, and these competing reactions prevent the potential from rising high enough to generate hydroxyl. In particular, titanium anodes doped with platinum group metals are very good oxygen electrodes, and efficiently oxidize water to oxygen far below the positive potential required to generate hydroxyl. Ruthenium-doped anodes oxidize chloride ion to chlorine gas at near the equilibrium potential for that reaction. Also, ruthenium doped anodes are severely corroded when operated at potentials significantly more positive than that required to generate chlorine, particularly at pH above seven. For these reasons, prior art coated titanium anodes are completely unsuited to electrochemical generation of hydroxyl and the nonselective oxidation of chemical substances dissolved in water.

U.S. Pat. No. 3,846,273 and U.S. Pat. No. 4,484,999 each describes an electrode that includes an oxide coating which may include the oxides of Ti, Nb, and Ta, and an electrode preparation method which involves brushing onto a titanium metal substrate, a solution which includes compounds of the metals desired in the oxide coating, and then heating the electrode in air to evaporate and thermally decompose the coating solution and produce the oxide coating. However, neither U.S. Pat. No. 3,846,273 nor U.S. Pat. No. 4,484,999 hint or suggest that a +4 valence state is desirable in electrode manufacture. Indeed, their teachings are directly to the contrary. Heating the electrodes in air produces an oxide coating wherein Nb and Ta are in the of +5 valence state, a state that is vastly inferior in electrical conductivity to the +4 valence state of Nb or Ta specified by us. Furthermore, the electrodes described by U.S. Pat. No. 3,846,273 also includes a large proportion of a platinum group metal while the electrodes described in U.S. Pat. No. 4,422,917 include two layers: a thin layer of titanium dioxide mixed with niobium oxide or tantalum oxide plus a second layer which includes titanium dioxide with a large admixture of a platinum group metal. We specify that our electrodes not include an electrochemically significant amount of a platinum group metal for reasons recited in the previous paragraph.

U.S. Pat. No. 4,422,917 reports a ceramic electrode material of the general composition $TiO_x$, where x may be in the range 1.55 to 1.95. In effect, these electrodes consist entirely of the oxide coat, with no metallic substrate. This material is produced by reducing titanium dioxide by heating it in an atmosphere of hydrogen at a temperature typically near 1150° C. In this range of composition, the electrical conductivity of titanium oxide is sufficient to use the material as an electrode.

It is easy to deposit a layer of titanium dioxide upon the surface of a titanium metal substrate, or to produce a layer of titanium dioxide upon the surface of the metal by heating the metal in air at elevated temperature. In principle, the titanium dioxide layer thus deposited may be reduced to convert it to a composition $TiO_x$ where x is in the range 1.55 to 1.95 by heating the electrode in an atmosphere of hydrogen at 650° C. or higher temperature. As noted in U.S. Pat. No. 4,422,917, this procedure causes severe hydriding and embrittlement of the titanium metal substrate, making the electrode useless. This observation has been confirmed by us. For this reason, an electrode with a titanium metal substrate cannot be prepared with a conductive coating of $TiO_x$ as described in U.S. Pat. No. 4,422,917.

Furthermore, $TiO_x$ electrodes are rapidly damaged and develop a low conductivity layer of $TiO_2$ when operated at a potential sufficient to produce hydroxyl free radical (Graves and others, 1991), and therefore are impractical for this purpose.

Salvador (1980) described the preparation and properties of polycrystalline $TiO_2$ electrodes doped with 0.12, 1.2 and 13.1 mole percent Nb. This material was prepared from $TiO_2$ and $Nb_2O_5$, by repeated grinding, pressing, and sintering. The sintering temperature was 1200° C., and the cumulative sintering time approximately 50 hours under an atmosphere of nitrogen. X-ray diffraction indicated a solid solution with the rutile structure. The electrodes thus prepared were evaluated for possible use in a process to produce hydrogen from water utilizing solar energy.

Khodos and others (1988) described $TiO_2$ doped with up to 13 mole percent Nb and its preparation by sintering at 1230° to 1400° C., and concluded that the material was a solid solution with the crystal structure of rutile. Babich and others (1988) reported a similar material produced by combining a solution of $TiO_2$ in hydrochloric acid with a solution of $Nb_2O_5$ in oxalic acid, adding sufficient ammonium hydroxide to the mixture to increase pH to 8.3 and precipitate a mixed hydrous oxide, and finally heating the washed precipitate. Neither Khodos nor Babich attempted to prepare electrodes from the material, and were primarily interested in describing the crystal structure and phase relations in the system $TiO_2$-$Nb_2O_5$.

Madou and others (1984) described the properties of an electrode consisting of a large single crystal of rutile doped with 0.03 atom percent Nb, which was being evaluated as a possible pH sensor for high temperature use. For reasons of cost, single crystal electrodes are practically limited to applications where cost is of little importance, and the electrode need not be very large.

Salvador, Madou, Khodos and others, and Babich and others all considered the materials they had produced to be solid solutions of $TiO_2$ and $Nb_2O_5$ with the rutile structure. While prolonged heating at high temperature under vacuum or inert gas may cause some small degree of reduction of $Nb^{+5}$ to $Nb^{+4}$, and to a lesser degree reduction of $Ti^{+4}$ to $Ti^{+3}$, the materials described by the cited authors consisted predominantly of $TiO_2$ and $Nb_2O_5$.

Ammonium niobate is a substance whose variable composition is approximated by the formula $NH_4NbO_3 \cdot xH_2O$ where x=0 to 2. The preferred embodiment of our process for producing the electrodes requires ammonium niobate as the source of niobium. Prior to our method for coating electrodes, there were no uses for ammonium niobate, and the ammonium niobate existed only as a subject of laboratory study. Ammonium niobate is not commercially available. Only laboratory methods for preparing ammonium niobate were found in the literature, and these methods are poorly suited for producing more than a few grams of ammonium niobate at a time, and are inefficient even on that small scale.

Ammonium niobate is highly soluble in water, and solutions including up to 21 w/w% $Nb_2O_5$ may be prepared by carefully controlling the mole ratio $NH_4^+$/Nb (Guerchais and Spinner, 1965). The solubility of ammonium niobate decreases rapidly with increasing concentration of $NH_4OH$ (same ref.), and therefore, ammonium niobate may be precipitated from solution by adding ammonium hydroxide and ammonium salts.

Guerchais and Rohmer (1964) synthesized ammonium niobate by double displacement of potassium niobate (also very soluble in water) with ammonium chloride in a solution that also included ammonium hydroxide. Their procedure is the nearest prior art. Thirty grams of potassium niobate (stated by Guerchais and Rohmer to have the composition $K_7HNb_6O_{19} \cdot 12H_2O$) was dissolved in 1.2 L of water, then 300 mL of concentrated aqueous $NH_4OH$ and 150 g of $NH_4Cl$ were added, and the reaction mixture was cooled to 0°-10° C. Needle-like crystals of ammonium niobate subsequently formed in the solution. The reaction mixture described by them included 1.9N $NH_4Cl$, 2.9N $NH_4OH$, and 1.2 w/v% $Nb_2O_5$. With this composition, the mixture would not precipitate ammonium niobate at room temperature. At T=0°-10° C., it is barely supersaturated, and ammonium niobate precipitates slowly and incompletely to form well-formed crystals, and a large fraction of the Nb remains in solution.

Also, the amount of concentrated $NH_4OH$ and $NH_4Cl$ used is large in relation to the amount of ammonium niobate produced. A practical industrial process would require that reagents be recovered from the reaction mixture and reused. In practice, ammonium hydroxide would be recovered by distillation, and ammonium chloride by sublimation. Ammonium chloride sublimes near 340° C., a temperature that is inconveniently high for this purpose. The residue after sublimation would consist of byproduct KCl and $Nb_2O_5$ not converted to ammonium niobate; the KCl would need to be dissolved in water and separated from the $Nb_2O_5$ in order for the $Nb_2O_5$ to be reused. Because of the large concentration of chloride ion in the reaction mixture, the ammonium niobate produced may be contaminated with ammonium chloride. For all of these reasons, the method described by Guerchais and Rohmer (1964) is inefficient in regard to utilization of reagents and product yield, and is poorly suited for industrial production and purification of ammonium niobate.

Objects and Advantages

The several objects and advantages of our invention are:

We have invented an electrode which is capable of operating at a potential sufficiently positive to produce hydroxyl free radicals and release them to aqueous solution.

The electrodes consist of a metallic substrate composed of titanium or a titanium alloy, with a coating which includes titanium dioxide and also niobium or tantalum in the +4 oxidation state to render the titanium dioxide usefully conductive when operated at a large positive potential.

In one embodiment, the metallic substrate consists of sintered Ti-metal fibers or particles, coated with said oxide coat, producing a porous anode. The porous anode has very large surface area, and is particularly beneficial when dilute contaminants in water must be destroyed, because in this situation, process performance is limited by mass transfer, and the rate of mass transfer is determined in large part by the surface area of the anode.

Most electrode materials will corrode severely at a potential positive enough to generate hydroxyl. The electrodes described here have the excellent corrosion resistance typical of titanium dioxide. While it is not stable in contact with air in a thermodynamic sense, in practice $NbO_2$, is very inert, and a solid solution of $NbO_2$ in $TiO_2$ (the composition of the oxide coating on our electrodes) is very resistant to oxidation. The chemical inertness and thickness of the oxide coat (typically 2 to 10 micrometers) also suggest that these electrodes will not suffer hydrogen embrittlement when operated under cathodic polarization for an extended period of time, because the diffusion coefficient of hydrogen through $TiO_2$ at room temperature is very small.

In U.S. Pat. No. 4,422,917, it is stated that "It is important to note that hydrogen reduction of $TiO_2$ is only practical in circumstances where the material is not applied to a titanium substrate. Thus, because of the great affinity of titanium for hydrogen, any attempt to reduce a titanium oxide layer on titanium by heat treatment at temperature in excess of 1000° C. in a hydrogen atmosphere would lead to total embrittlement and failure of the titanium substrate." We have succeeded in imparting useful conductivity to a niobium-doped titanium dioxide layer coated upon a titanium metal substrate by heating it in hydrogen without causing hydriding or embrittlement, an entirely nonobvious result. Success in this regard is due to the greater ease of reduction of pentavalent niobium to tetravalent niobium, which occurs under much milder conditions than are required to reduce tetravalent titanium to lower valence states. The mild conditions are ensured by adding a small amount of water vapor to the hydrogen, a nonobvious modification of the hydrogen annealling procedure. The requisite amount of water vapor is added to the hydrogen by passing the hydrogen over powdered titanium dioxide before it contacts the coated electrode, or it may be added to the hydrogen by other means; for example, by first bubbling through water an appropriate portion of the hydrogen supplied to the annealling apparatus.

We have further invented a coating method for producing the electrodes wherein most of the titanium oxide content is derived from an a reactive slurry of $TiO_2$ in water, and no organic solvent is required. This method has large advantages in regard to cost, process safety, and environmental protection over published methods involving organometallic compounds and organic solvents that are used to produce oxide coated Ti-electrodes of different composition that are used for different applications. The niobium compound used in the preferred embodiment of this process is ammonium niobate.

We have also invented an improved process for producing ammonium niobate, which allows much improved product yield and greatly reduced consumption of chemicals relative to prior art. Our process is well suited for industrial production of ammonium niobate, and addresses a need previously unrecognized.

Definition of Terms

"Additive metal" refers to Nb or Ta or some combination thereof present in the oxide coating of our electrodes as $NbO_2$ or $TaO_2$.

"Ammonium niobate" is a chemical substance whose variable composition is approximated by the formula $NH_4NbO_3 \cdot xH_2O$ where x=0 to 2. Because we are concerned only with solutions of ammonium niobate, the hydration number of the solid is not important to our purpose, nor is the precise value of the mole ratio $NH_4/Nb$.

"Anneal" or "hydrogen anneal" refers to the final step in producing the electrodes, wherein the electrode is heated at a temperature between 600° and 1000° C. in an atmosphere of hydrogen which includes a sufficient amount of water vapor to prevent hydrogen embrittlement or hydriding of the Ti-metal substrate.

"Anode" is an electrode to which positive voltage is applied.

"Aqueous coating composition" is a fluid, water based composition used in coating the electrodes. It includes the subclasses "aqueous coating slurry" which includes reactive slurry of $TiO_2$, and "aqueous coating solution" which does not.

"Bipolar cell" comprises a multipilicity of bipolar electrodes assembled in an array so that current flows through the cell perpendicular to the bipolar electrodes.

"Bipolar electrode" is a planar electrode wherein one surface serves as an anode, and the other surface serves as a cathode.

"Coat weight", expressed in mg $cm^{-2}$, is the weight gained by the electrode when coated, divided by the area coated.

"Cathode" is an electrode to which negative voltage is applied.

"Contaminant" is the substrate in the case that the anode is being used to purify contaminated water.

"Cyclic voltammetry" refers to an electrochemical test procedure described in the section "Methods of testing electrode performance".

"Electrochemical cell" or simply "cell" comprises one or more anodes, one or more cathodes, and an aqueous electrolyte is present between adjacent anodes and cathodes.

"Electrode" is a term that includes both "anode" and "cathode". If alternating current is used, the same electrode may alternate between serving as an anode and a cathode.

"Fluid coating composition" includes the subclasses "aqueous coating composition", "aqueous coating slurry", "aqueous coating solution", and "organic coating solution".

"Fused", in relation to the metallic or nonmetallic particles or fibers of which a porous anode is comprised, means securely and permanently joined to form a coherent, porous structure with electrical conductivity adequate to function as an electrode. The particles or fibers may be fused by sintering, welding, hot pressing, depositing an oxide coating upon the particles so that the particles are cemented together, or by other suitable means.

"Mixed metal oxide material" refers to a material including titanium dioxide and also including an admixture of Nb or Ta, wherein at least part of the Nb or Ta is in the +4 valence state.

"Mole fraction of additive metal" or simply "mole fraction" is the mole fraction of (Nb+Ta) relative to total moles of metal in the oxide coating expressed as a percentage: mole fraction = $100\% \times (Nb+Ta)/(Ti+Nb+Ta+\text{other metals})$ "Mole fraction of additive metal in the +4 valence state relative to total metal" in the oxide coating = $100\% \times (Nb^{+4}+Ta^{+4})/(Ti+Nb+Ta+\text{other metals})+4+4$
The numerator is the number of moles of $Nb^{+4}+Ta^{+4}$ in the +4 state only, while the denominator includes the number of moles of all metals in the oxide coating, regardless of oxidation state.

"Niobic acid" is a hydrated, amorphous form of niobium pentoxide which may be produced by reacting with water a fused mixture of niobium pentoxide and potassium hydrogen sulfate. Its composition may be written as $Nb_2O_5 \cdot xH_2O$. Niobic acid may also be produced by decomposing other niobium compounds in aqueous media (for example, niobium pentachloride or niobium ethoxide), by acidifying a solution including potassium niobate or ammonium niobate, or by other suitable means.

"Peak current density" is the current density (I/A) recorded at the peak potential (3.45 v vs. SHE) when testing electrodes by cyclic voltammetry (FIGS. 8 to 10).

"Permeable cathode", in the present specification and claims, is a cathode that consists of an electrically conductive structure which is porous or perforated or otherwise provided with numerous openings which allow water easily to flow through the cathode perpendicular to its plane. The permeable cathode may comprise an expanded metal mesh, wire cloth, perforated sheet metal, sintered metal fibers, sintered metal powder or another metal structure that provides electrical conductivity and permeability to water flow. The permeable cathode may be fabricated of nickel, titanium, or another suitable metal. It may be fabricated of a conductive nonmetallic material; for example, graphite fibers, graphitized cloth, or a conductive metal oxide. The permeable cathode may be identical to the porous anode.

"Platinum group metals" are Ru, Rh, Pd, Os, Ir, and Pt.

"Porous anode", is comprised of a metallic substrate formed of Ti-metal fibers or particles, sintered or welded or otherwise fused at their contact points to produce a porous and permeable, but physically coherent and electrically conductive structure, and said metallic substrate is coated with an oxide coating of appropriate composition. In another embodiment, the porous anode consists of particles of mixed metal oxide material of appropriate composition, pressed, sintered, or otherwise fused together to produce an electrically conductive structure.

"Potassium niobate" is a chemical substance whose variable composition is approximated by the formula $K_8Nb_6O_{19} \cdot 16H_2O$. Because we are concerned only with solutions of potassium niobate, the hydration number of the solid is not important to our purpose, nor is the precise value of the mole ratio K/Nb.

"Reactive slurry of $TiO_2$" is a material made by precipitating hydrated titanium dioxide from a solution of $TiO_2$ dissolved in strong aqueous acid, or by decomposing an organic compound or chelate of titanium in an aqueous medium. The preferred and most readily and cheaply available reactive slurry of $TiO_2$ is made by seeding and heating a solution of $TiO_2$ in concentrated sulfuric acid. This material is a precursor in the production of anatase pigment by the sulfate process. A "reactive slurry of $TiO_2$" might also include ultrafine anatase or rutile pigment, wherein particle size is small enough for the $TiO_2$ particles in an intimate mixture with $Nb_2O_5$ formed during the electrode coating process to react and form a uniformly doped mixed metal oxide composition when heated under hydrogen containing a small amount of water vapor.

"Solid body", in reference to "mixed metal oxide material", means a coherent, solid body, which may possess some porosity, but wherein the volume fraction and geometry of said porosity are such that said solid body is essentially impermeable to water flow, and wherein the internal surface area (if any) does not significantly effect the electrochemical properties of an electrode comprising said solid body.

"Substrate" is the organic or inorganic chemical species dissolved in water which is oxidized by reaction with hydroxyl free radicals.

"Test electrodes" were fabricated from $0.25'' = 0.635$ cm diameter rods of Ti-Gr. 2, coated, annealled, and part of the coating removed to leave a coated area = 7.6 $cm^2$

BRIEF DESCRIPTION OF THE DRAWING

By way of example, embodiments of the present invention will now be described with reference to the accompanying drawings, of which.

Reference Numerals in Drawings

Figure 1:
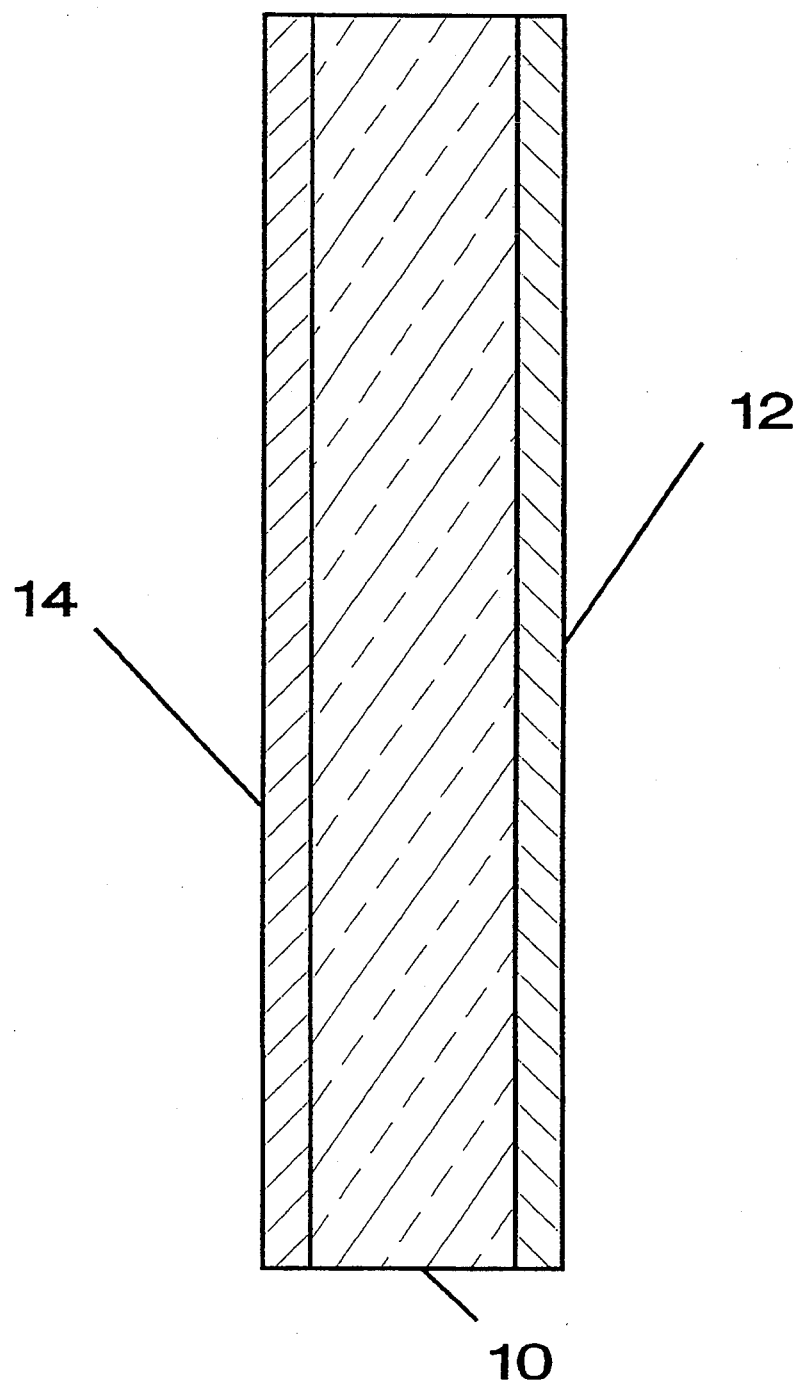
FIG. 1 depicts in cross section an electrode with an oxide coating.
Figure 2:
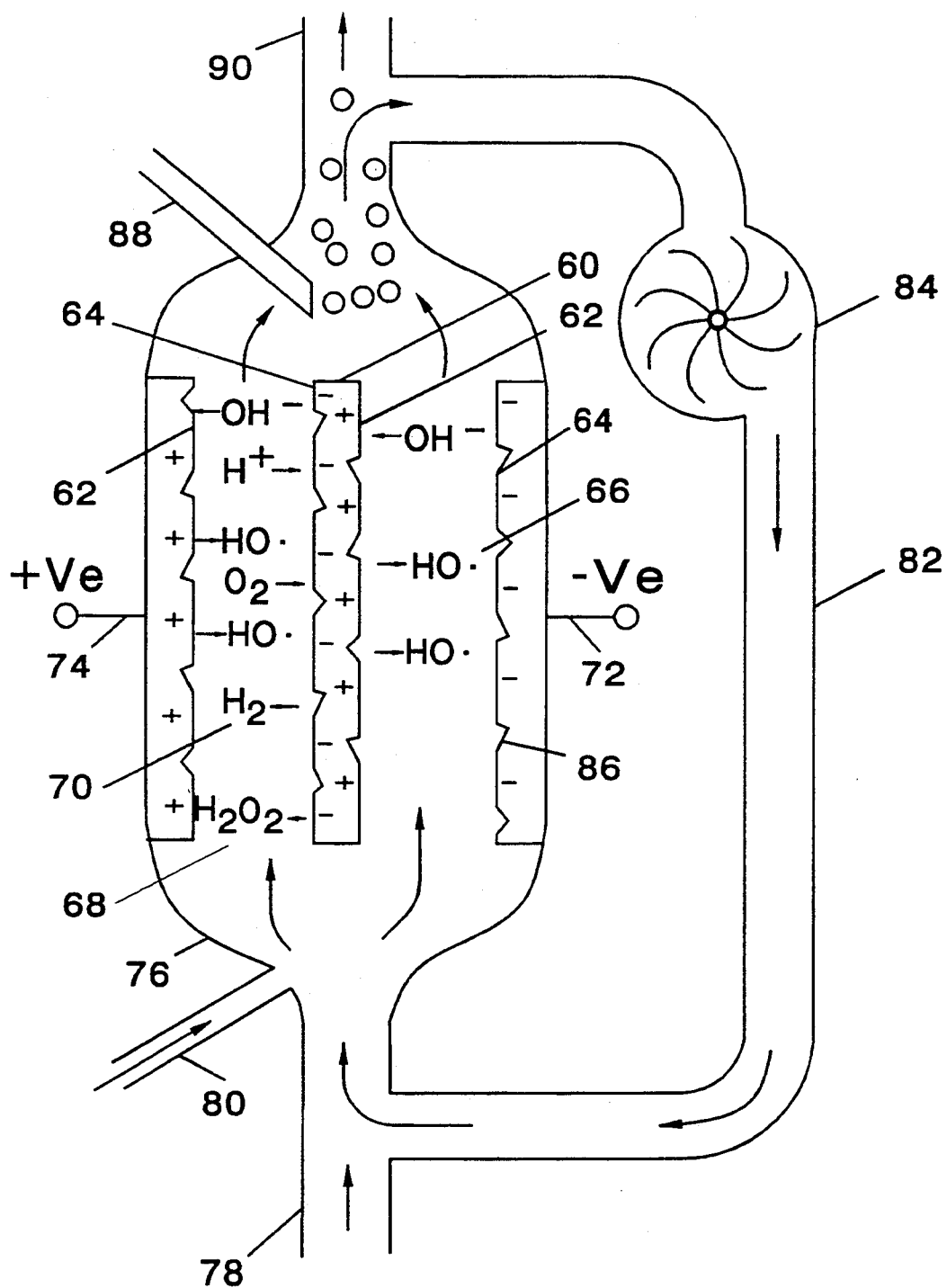
FIG. 2 depicts a bipolar electrochemical cell that includes an array of bipolar electrodes.
Figure 3:
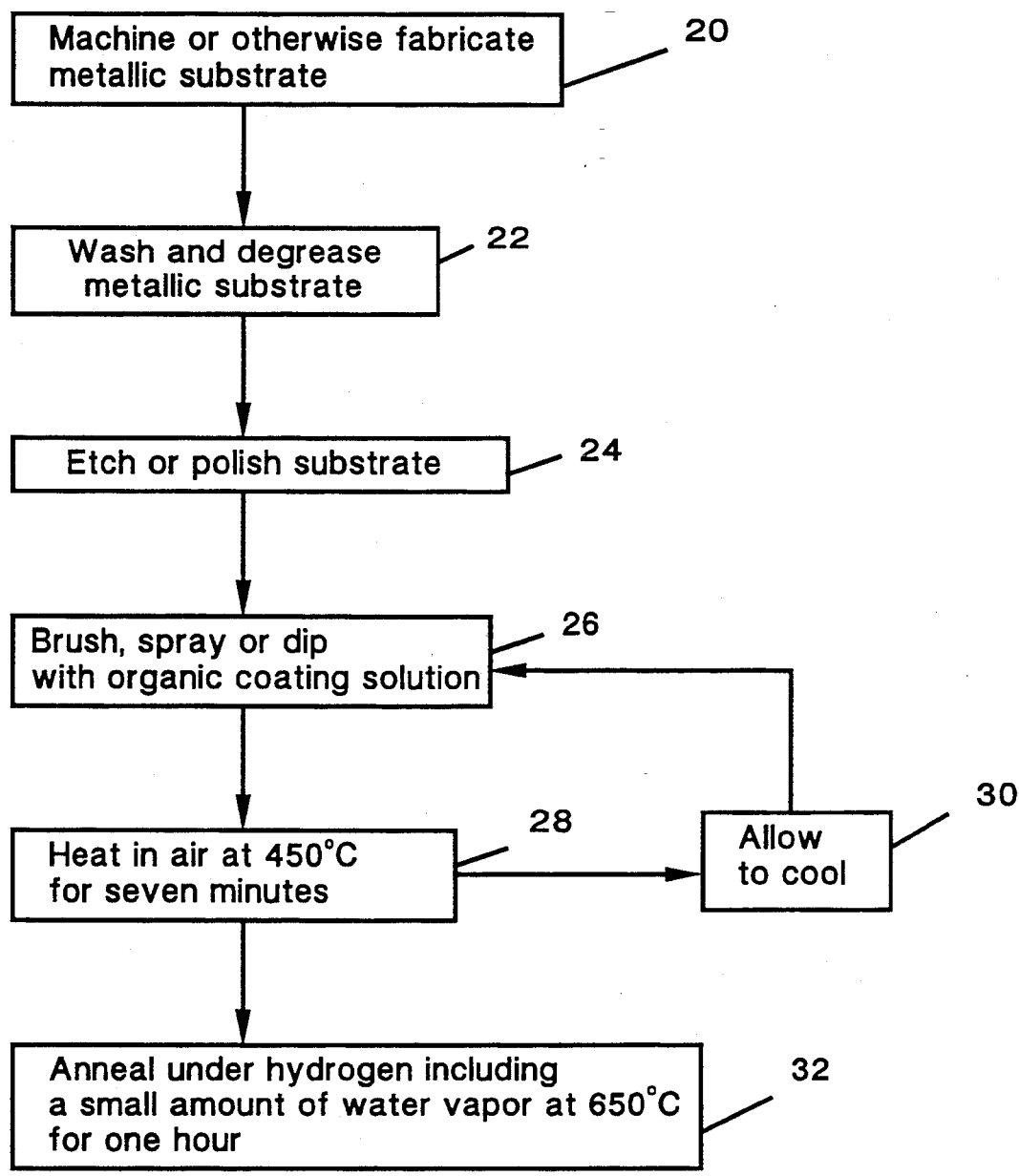
FIG. 3 is a flow chart describing the process for coating the electrodes utilizing an organic coating solution including Ti source compounds and Nb source compounds in an organic solvent.
Figure 4:
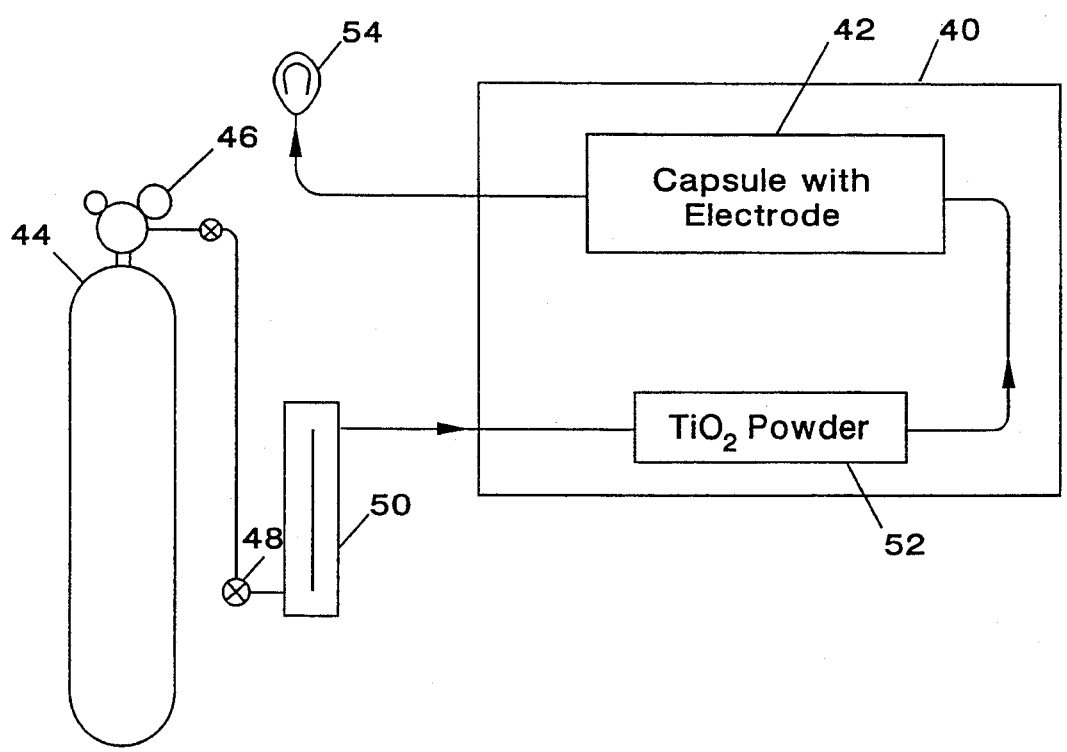
FIG. 4 depicts an apparatus for the final, hydrogen annealling step in producing the coated electrodes.
Figure 5:
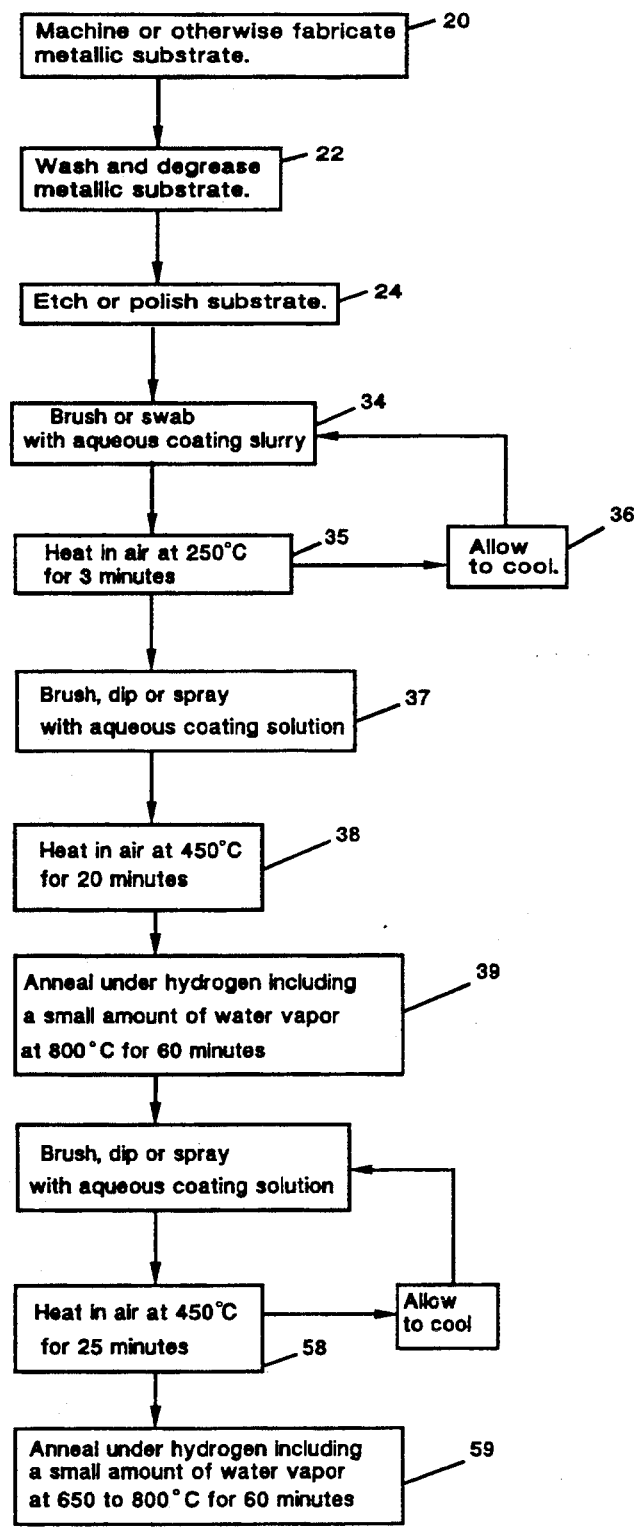
FIG. 5 is a flow chart describing the process for coating the electrodes utilizing an aqueous coating slurry that includes a reactive slurry of $TiO_2$ particles and a soluble Nb source compound, in combination with an aqueous coating solution.
Figure 6:
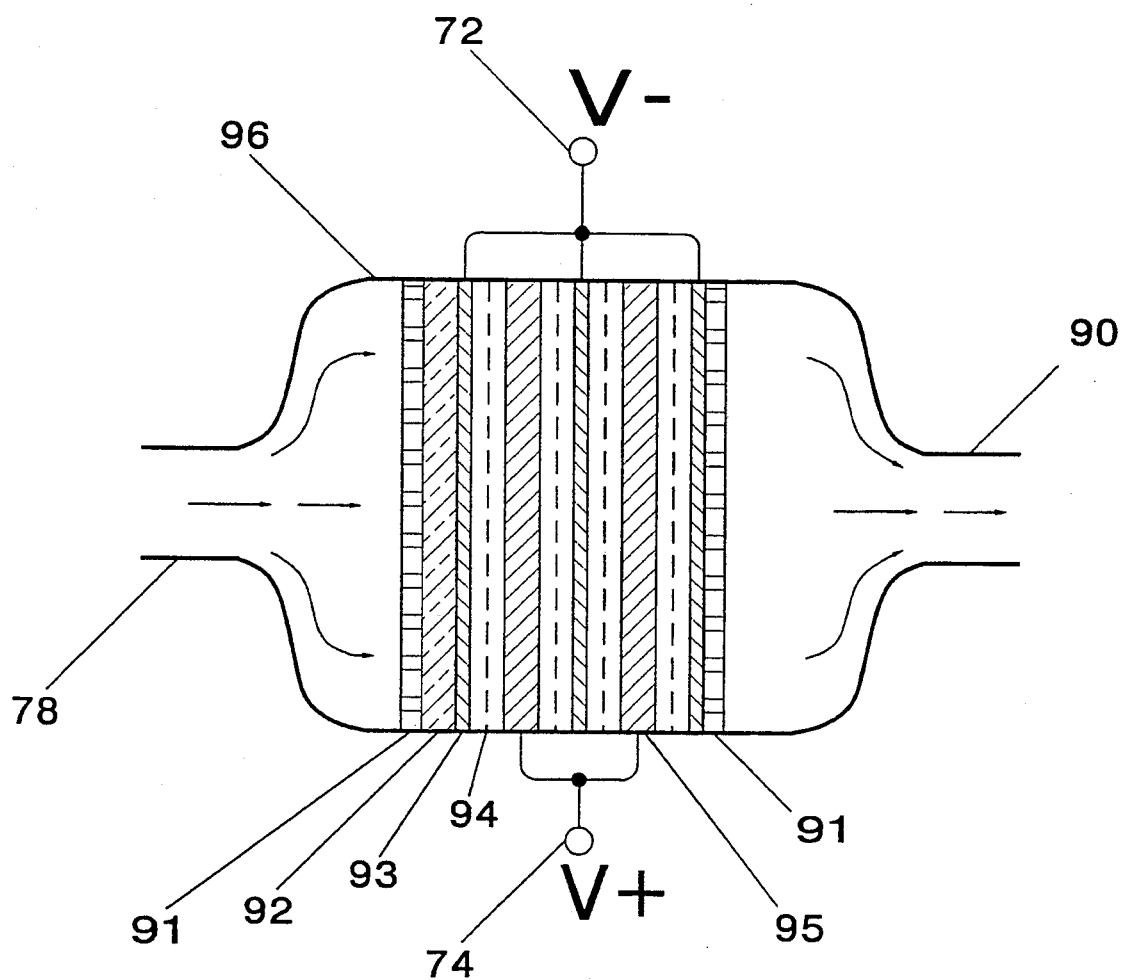
FIG. 6 depicts an electrochemical cell that includes porous anodes.
Figure 7:
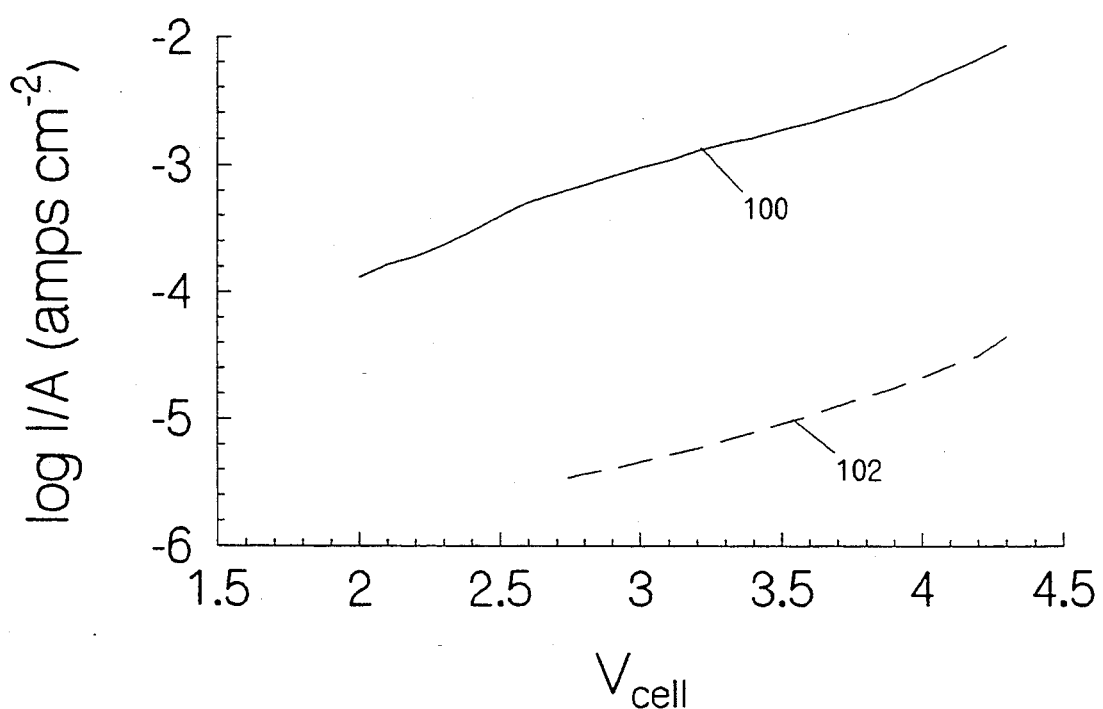
FIG. 7 illustrates the beneficial effect upon electrical conductivity of annealling the electrode in an atmosphere of hydrogen including a small concentration of water vapor.
Figure 8:
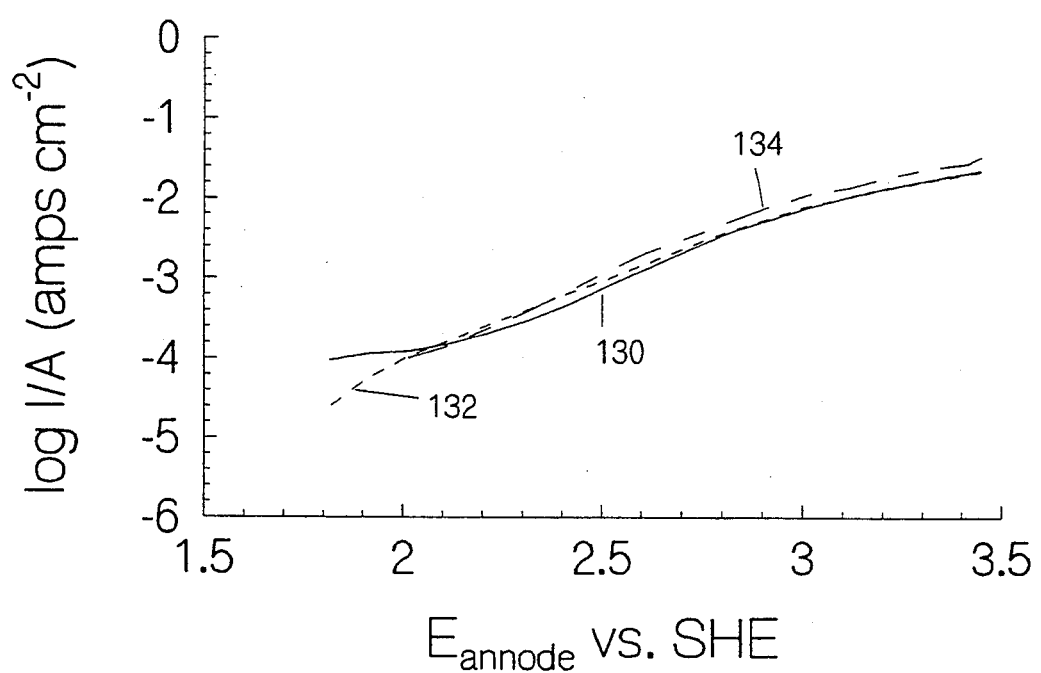
FIG. 8 illustrates the relationship of current density vs. anode potential for a series of electrodes prepared using organic coating solutions as described in Examples 1 to 3.

FIG. 1:
10 metallic substrate composed of titanium or titanium alloy
12 oxide coating comprising $TiO_2$ and an admixture of Nb or Ta or a combination thereof, wherein at least part the Nb or Ta is in the +4 valence state
14 oxide coating on the cathode side FIG. 2:
60 a bipolar electrode
62 the anodic face of the bipolar electrode
64 the cathodic face of the bipolar electrode
66 hydroxyl radical produced at the surface of the anode
68 hydrogen peroxide produced at the surface of the cathode
70 molecular hydrogen produced at the surface of the cathode
72 the negative pole of a source of electric current is connected to the last electrode at one end of the cell
74 the positive pole of a source of electric current is connected to the last electrode at the opposite end of the cell
76 housing for the bipolar cell
78 water to be purified
80 sodium carbonate injection
82 recirculated water
84 recirculation pump
86 surface of electrodes is roughened
88 air injection
90 purified water flows out of the cell FIG. 3:
20 fabrication of the metallic substrate of the electrode
22 cleaning of the metallic substrate
24 etching or polishing to remove oxide film
26 application of organic coating solution
28 heat in air to dry and decompose the coating solution to mixed metal oxides
30 allow to cool before applying more coating organic solution
32 anneal under hydrogen including traces of water vapor FIG. 4:
40 box furnace
42 stainless steel capsule with electrodes inside of it
44 source of hydrogen gas
46 regulator
48 metering valve
50 gas flow meter
52 capsule containing $TiO_2$ powder
54 excess hydrogen is flared-off FIG. 5:
20 fabrication of the metallic substrate of the electrode
22 cleaning of the metallic substrate
24 etching or polishing to remove oxide film
34 application of aqueous coating slurry
35 heat in air at 250° C. for 3 minutes allow electrode to cool before applying more aqueous coating slurry
37 coat electrode with aqueous coating solution
38 heat in air at 450° C. for 20 minutes
39 anneal under hydrogen including traces of water vapor at 800° C. for 60 minutes
56 coat electrode with aqueous coating solution
58 heat in air at 450° C. for 25 minutes
59 anneal under hydrogen including traces of water vapor at 650°–800° C. for 60 minutes FIG. 6:
72 the negative pole of a source of electric current is connected to the permeable cathodes
74 the positive pole of a source of electric current is connected to the porous anodes
78 water to be purified flows into the cell
90 purified water flows out of the cell
91 perforated plastic end plate
92 prefilter
93 permeable cathode
94 permeable nonconductive separator
95 porous anode
96 housing of porous anode cell FIG. 7:
100 plot of log (current/area) vs. cell voltage using an anode with 4% Nb doping, annealled under hydrogen including small amount of water vapor
102 plot of log (current/area) vs. cell voltage using an anode with 4% Nb doping, not annealled FIG. 8:
130 electrode prepared using organic coating solution that includes HCl, described in Example 1.
132 electrode prepared using organic coating solution that includes no acid, described in Example 2.
134 electrode prepared using organic coating solution wherein the titanium butoxide and niobium butoxide have been partially polymerized, described in Example 3.

Figure 9:
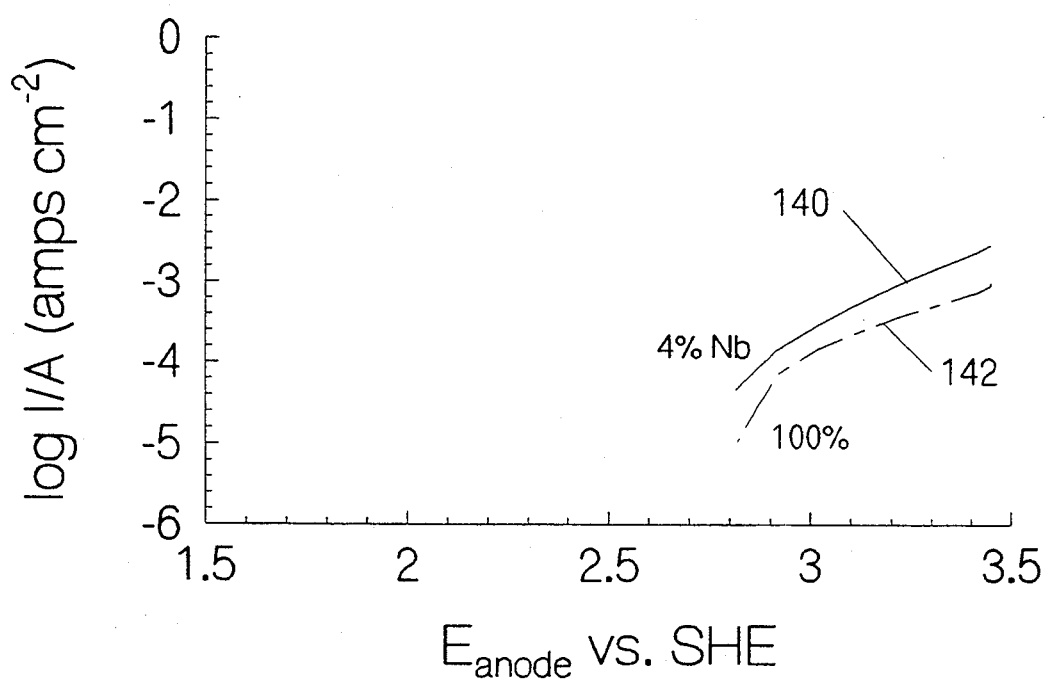
FIG. 9 illustrates the relationship of current density vs. anode potential for two electrodes coated utilizing aqueous coating solutions as described in Examples 4 and 5.

FIG. 9:
140 electrode prepared using an aqueous coating solution with 4% mole ratio Nb, compounded of soluble compounds of Ti and Nb as described in Example 4
142 electrode prepared using an aqueous coating solution with 100% mole ratio Nb as described in Example 5

Figure 10:
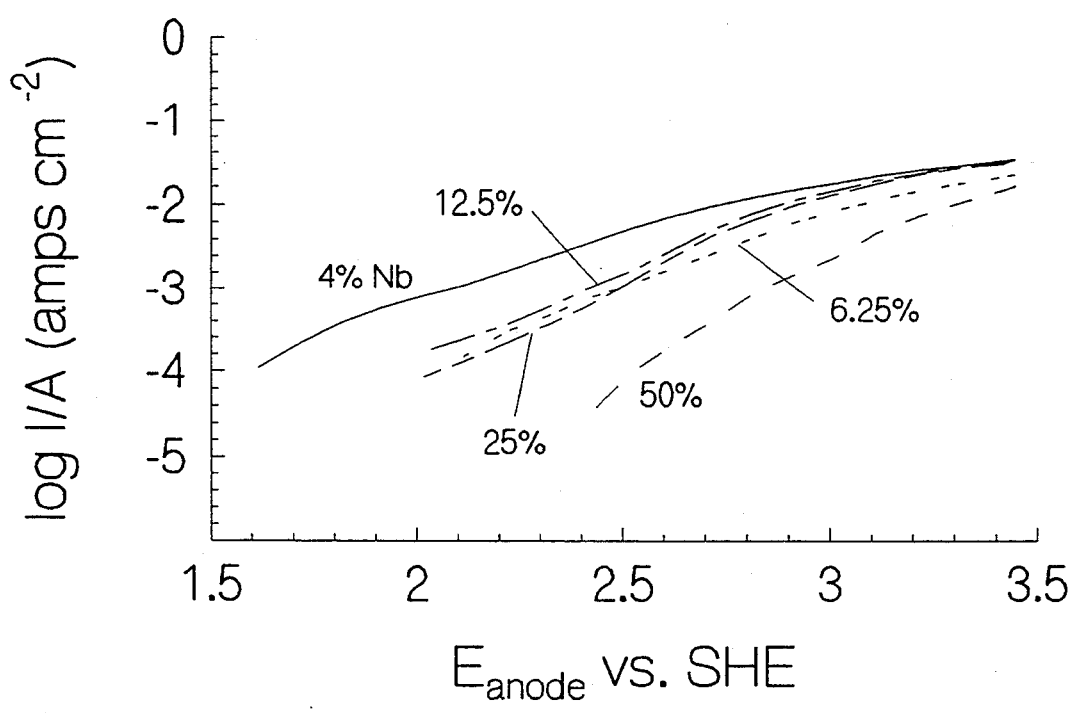
FIG. 10 illustrates the relationship of current density vs. anode potential for a series of electrodes prepared using aqueous coating slurries which include a reactive slurry of $TiO_2$, in combination with an aqueous coating solution (the process depicted in FIG. 5 and demonstrated in Example 8).

FIG. 10:
Numbers attached to curves indicate mole percent Nb relative to (Ti+Nb) in the oxide coating of the corresponding anode.

DESCRIPTION OF THE INVENTION

The present invention provides a coated electrode for use in electrochemical cells wherein the base metal consists of titanium or a titanium alloy, and the oxide coating includes titanium dioxide, with an admixture of niobium or tantalum in the +4 valence state, wherein the mole fraction of niobium or tantalum is preferably in the range of two to six mole percent, and platinum group metals are not present in electrochemically significant amount.

Tantalum is very similar to niobium in its chemical behavior, and we have demonstrated that substituting Ta for Nb in the composition of the oxide coating produces an equally good electrode (Example 10). Therefore, either Nb or Ta or any combination of Nb and Ta may be used as the additive metal which imparts useful conductivity to $TiO_2$ when present in the +4 oxidation state.

The present invention also provides an electrochemical cell which includes an array of said electrodes, wherein the electrodes are bipolar electrodes. It also provides an electrochemical cell which includes a multiplicity of porous anodes, said porous anodes comprising a Ti-metal substrate covered with aforesaid oxide coating, or a porous aggregate of particles composed of a mixed metal oxide material with composition similar to aforesaid oxide coating.

The present invention also provides novel mixed metal oxide materials that are comprised of titanium dioxide with an admixture of niobium or tantalum, wherein between 25 and 100% of the Nb or Ta is in the +4 valence state, and solid and porous electrodes composed of said mixed metal oxide materials.

Conductivity, Annealling, and Oxidation State

The present invention also provides a method of manufacturing aforesaid electrodes, which involves the steps of baking-on under air an oxide coating which includes titanium dioxide with an admixture of niobium or tantalum, and then annealling the electrode under hydrogen which includes an amount of water vapor sufficient to prevent hydriding and embrittlement of the titanium substrate, but small enough to allow the niobium or tantalum in the oxide coating to be reduced to the tetravalent oxidation state by reaction with hydrogen.

It is believed that the green coat baked-on in air possesses an amorphous structure, wherein titanium is in the tetravalent state, and niobium is in the pentavalent state. Subsequent annealling under hydrogen that includes a small amount of water vapor causes the niobium to be reduced to the tetravalent state. At the same time, the titanium dioxide coat is dehydrated and converted partially or completely into a crystalline form, with the niobium dioxide mixed in it, predominantly in true solid solution. Annealled $TiO_2$ is very stable and very insoluble, and therefore, the tetravalent niobium is protected from oxidation at the high anodic potential needed to generate hydroxyl free radicals.

Each atom of niobium in the tetravalent state contributes its single remaining d-electron to the conduction band, converting the oxide coating into an heavily doped n-type semiconductor. Anodic polarization sufficient to oxidize water to hydroxyl causes severe bending of the conduction band in the doped oxide layer adjacent to the solid-liquid interface, making possible tunneling of electrons from water molecules or hydroxide ions adjacent to the surface of the oxide coating directly into the conduction band. Thereby the doped oxide layer is able to function as an anode despite its n-doped character. The doped oxide layer also conducts current easily when cathodically polarized, precisely because of its n-doped character.

While we believe that the theoretical explanations presented in this section are correct, we do not wish to be bound by them.

Aqueous Coating Compositions

An aqueous coating composition is preferred to an organic coating solution because it allows the organic solvent to be eliminated, thereby making the electrode manufacturing process much simpler, safer and much more environmentally benign.

An aqueous coating composition may be an aqueous coating solution that includes a water soluble titanium source compound and a water soluble niobium source compound. No inorganic titanium compounds are usefully soluble in aqueous media other than concentrated acid solutions. However, water soluble Ti-compounds are known in which titanium is complexed by organic ligands, and several compounds of this description are commercially available. The aqueous coating compositions described in Examples 4 and 8 include dihydroxybis(ammonium lactato)titanium (CAS No. 65104-06-5) as the water soluble source of $TiO_2$. This compound is sold by dupont under the name Tyzor LA®, which contains 13.7 w/w% = 16.6 w/v% $TiO_2$. Several other water soluble titanium chelates are available commercially.

The Ti-chelates decompose to amorphous $TiO_2$ when heated in air, and the amorphous $TiO_2$ seals and cements the oxide coating. This property is exploited when an oxide coating produced using an aqueous coating slurry is subsequently overcoated using an aqueous coating solution, thereby making the oxide coating more adherent and eliminating the chalky texture that might otherwise be present.

A wetting agent was also used to improve wetting of the metal substrate by the coating solution. The particular wetting agent used was 1,1,3,3-tetramethylbutylphenoxypolyethoxyethanol (CAS No. 9036-19-5), available from Rohm and Haas under the trade name Triton X-100®. A wide variety of wetting agents are commercially available, and many other products would serve well in this application.

In formulating an aqueous coating composition, it is advantageous to use a reactive slurry of $TiO_2$ as the major titanium source compound, because this material is much cheaper than water soluble titanium chelates and produces no organic fumes when heated during the coating process. It also produces a superior oxide coating (Example 8).

A reactive slurry of $TiO_2$ made by seeding and heating a solution of $TiO_2$ in concentrated sulfuric acid is a precursor in the manufacture of anatase pigment, and is produced by all companies which manufacture anatase pigments by the sulfate process. In the United States, purified materials of this kind are sold by Kemira under the names Unitane 902 and 908. Unitane 902 is a slurry wherein the concentration of residual sulfuric acid and adsorbed sulfur trioxide is about 10 w% relative to $TiO_2$. Unitane 908 has been neutralized and washed to remove most of the sulfuric acid and dried to produce a damp powder containing about 75 w% $TiO_2$ and 1–3% $SO_3$, most of which is tightly bonded on to the $TiO_2$ particles, rather than free sulfuric acid or sulfate ion.

The preparation from Unitane 908 of the reactive slurries of $TiO_2$ used in formulating our aqueous coating slurries is described in Example 7. Small differences in the preparation of the slurry or in the starting material can have a large effect upon the viscosity of the resulting aqueous coating slurry and thereby upon the thickness and adhesion of the green oxide coating produced. For example, "$TiO_2$ slurry #2" made less viscous aqueous coating slurries than "TiO2 slurry #1". Aqueous coating slurries including washed Unitane 902 are still less viscous and form coats that are thin and uniform, but poorly adherent.

A coat weighing more than about 1 mg cm$^{-2}$ will usually peel or flake-off when baked. A single coat weight near 0.6 mg cm$^{-2}$ is best for producing the total oxide coating weight with a minimum number of coats and good adhesion. It is usually necessary to adjust the amount of water added to an aqueous coating slurry to provide a desirable slurry viscosity and coat weight.

In formulating an aqueous coating composition, it is advantageous to use a water soluble niobium source compound in order to provide easy handling and a high degree of chemical reactivity. The preferred compound for this purpose is ammonium niobate. When a solution of ammonium niobate is evaporated to dryness and the residue heated in air, the ammonium niobate rapidly decomposes to niobium pentoxide, and the only by-products of this reaction are ammonia and water vapor. Due to this reaction, ammonium niobate is an effective binder for the TiO2 particles in aqueous coating slurries. If ammonium niobate is present in the aqueous coating slurry, chelated Ti usually need not be included, although adding some amount of chelated Ti to an aqueous coating slurry does tend to improve the adhesion of the green oxide coating, particularly when the mole fraction of Nb is small.

Process for Producing Ammonium Niobate

The present invention also provides a convenient method for manufacturing ammonium niobate which provides a better reaction yield than the prior art method, consumes less chemical reagents, and produces a purer product. This process is well suited for industrial production of ammonium niobate.

Figure 11:
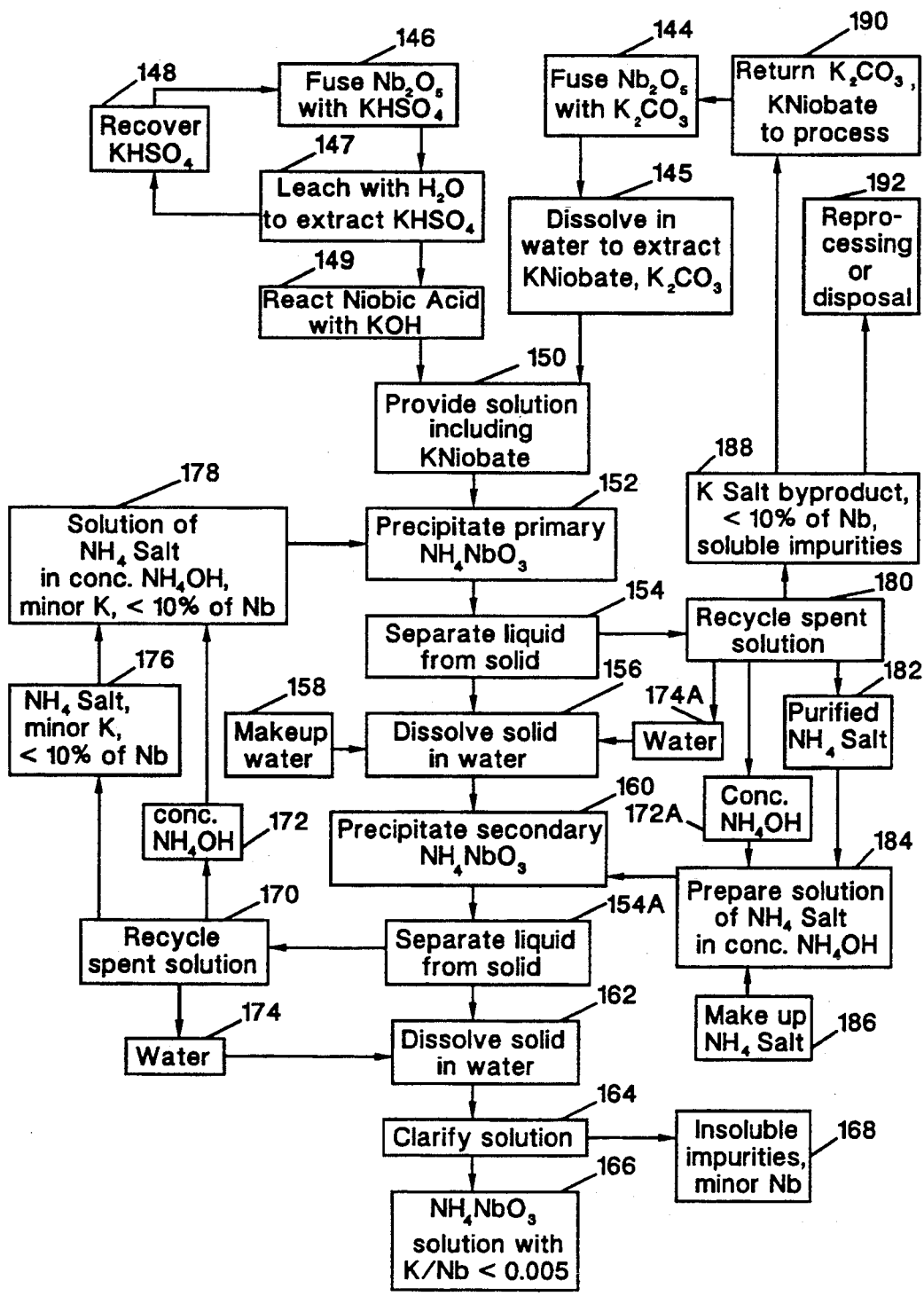
FIG. 11 illustrates the process for producing and purifying ammonium niobate.

FIG. 11 depicts a complete industrial process for producing ammonium niobate with high process efficiency, and extensive recycling of reagent chemicals. The process begins with providing a solution including potassium niobate. There are two practical processes available for producing potassium niobate.

(1) Potassium carbonate fusion.

Nb2O5 or niobic acid may be fused with potassium carbonate in weight ratio of 4 parts niobium pentoxide to 7 parts or more potassium carbonate at 1000° C. or higher temperature. Platinum crucibles may be used, and zirconia crucibles are acceptable because contamination with zirconium oxide will easily be separated during subsequent processing. Zr-metal crucibles may be used in an atmosphere of inert gas or a reducing atmosphere of combustion gases. The fused mixture is cooled, crushed, and leached in water. The resulting solution includes potassium niobate and nearly as much excess potassium carbonate. A precipitate of unreacted Nb2O5 and corrosion products from the crucible (e.g. ZrO2) may form.

Ammonium carbonate is the preferred reagent for precipitating NH4NbO3 in this case. The reaction cycle is then:

Fusion:

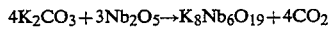

Conversion to ammonium niobate:

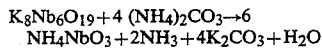

The net reaction is:

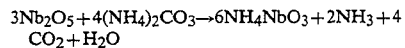

Potassium carbonate is recovered completely, and the only byproduct is a small amount of ammonia. This process is most efficient in terms of material utilization.

(2) Potassium hydrogen sulfate fusion

A mixture including 1 part Nb2O5 to 4 or 5 parts KHSO4 will fuse and react near 300° C. The fusion reaction is most conveniently performed in a borosilicate glass vessel. The flux is crushed and leached with water. Niobic acid precipitates, and potassium hydrogen sulfate goes into solution. The niobic acid is washed to remove KHSO4. Utilizing several extraction steps with counterflow of wash water and niobic acid, the KHSO4 can be separated as a concentrated solution (solubility at room temperature $\approx$27 w/w%), from which KHSO4 can be recovered by evaporation. Therefore, KHSO4 can be recovered with good efficiency, and the net reaction is conversion of Nb2O5 to niobic acid. The niobic acid reacts readily with KOH. In the laboratory, a mole ratio K:Nb=5:3 is used, and 3:2 should be adequate in an industrial process.

Ammonium acetate is the preferred reagent for precipitating NH4NbO3 in this case. The ammonium acetate reagent is most conveniently produced by reacting acetic acid with ammonium hydroxide on site. The reaction cycle is then:

Conversion to niobic acid (KHSO4 cycle):

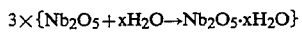

Conversion to potassium niobate (with 12.5% excess of KOH):

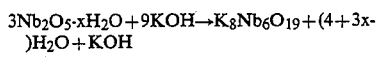

Formation of ammonium acetate:

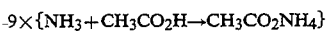

Conversion to ammonium niobate:

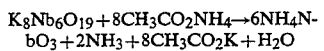

Reaction of excess KOH:

KOH+CH3CO2NH4→NH3+CH3CO2K+H2O

The net reaction is:

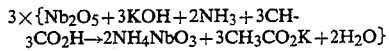

This combination of reactions is the preferred embodiment of the process.

The net reaction simultaneously converts Nb2O5 and ammonia to ammonium niobate, and consumes KOH and acetic acid to produce potassium acetate as a byproduct. The potassium acetate will come out of the process mixed with potassium niobate equivalent to 5–10% of the total Nb2O5 going through the process, and soluble impurities from various sources (the "primary nonvolatile salt residue" in the discussion related to FIG. 11). Most of the Nb content can be precipitated as crude ammonium niobate by dissolving this waste material in ammonium hydroxide solution, or precipitated as niobic acid by acidifying it with acetic acid or another acid. Practically all of the Nb may be precipitated as niobic acid, and acetic acid recovered by adding sufficient sulfuric acid or HCl to displace the acetic acid and distilling the mixture. In this case, the net consumption of acetic acid is zero, and the cheaper mineral acid is consumed instead. In this case, the byproduct will be fairly pure ammonium sulfate or ammonium chloride.

It is desirable to provide a solution of potassium niobate as concentrated as possible. The solubility of potassium niobate at room temperature is equivalent to 44 w/w% $Nb_2O_5$. In practice, the concentration of solutions produced using the $KHSO_4$ fusion cycle will be limited by the large amount of water entrained in the precipitate of niobic acid; in our experience, the precipitate includes about 75 w% water. The carbonate fusion cycle will produce solutions that include a large amount of potassium carbonate which will depress the solubility of potassium niobate through the common ion effect. In practice, solutions including 15-30 w/v% $Nb_2O_5$ will be used with either cycle. The maximum solubility of ammonium niobate is equivalent to about 21 w/w%=27 w/v% $Nb_2O_5$.

In practice, the ammonium niobate will be precipitated by adding to a solution including potassium niobate a reagent solution which includes about 3N ammonium carbonate or ammonium acetate dissolved in concentrated ammonium hydroxide (approximately 15N). Ammonium ion displaces potassium, and ammonium ion must be present in molar excess of potassium. The ammonium hydroxide in the reaction mixture resulting depresses the solubility of ammonium niobate, causing it to precipitate. Ammonium hydroxide and ammonium salt may also be added separately, and anhydrous ammonia may be used in place of ammonium hydroxide, or to make up ammonium hydroxide or the ammonium salt.

The solubility of ammonium niobate decreases rapidly with increasing concentration of ammonium hydroxide, and is less than 1 w/v% in a 7N solution of ammonium hydroxide. Preferably, a volume of said reagent solution not less than the volume of solution including potassium niobate is added to said solution including potassium niobate, resulting in a concentration of ammonium hydroxide of 7N or greater in the primary reaction mixture so produced, whereby most of the Nb content spontaneously precipitates as ammonium niobate.

Concentrated ammonium hydroxide and water are recovered from the spent solutions by distillation or some other appropriate process; for example, membrane perevaporation or reverse osmosis. Ammonium carbonate may be recovered by sublimation. Ammonium carbonate may be difficult dissolve due to formation of ammonium bicarbonate, which is relatively less soluble. Ammonium acetate melts at 114° C., and may be recovered from the primary salt residue by distillation at moderately higher temperature. Because ammonium acetate melts at a moderate temperature and is readily soluble in both water and concentrated ammonium hydroxide, it is easier to handle than ammonium carbonate.

Structure of the Electrodes—FIG. 1

The metal substrate 10 consists preferably of titanium or a titanium alloy. The oxide coating on the anode side 12 includes $TiO_2$ and also $NbO_2$ or $TaO_2$. The preferred mole fraction of (Nb+ Ta) in the oxide coating is 2 to 6 percent. The oxide coating on the cathode side 14 may be the same as the oxide coating on the anode side 12, or it may be different. The oxide coating on the cathode side 14 may be doped with a different additive metal (for example, platinum), or it may be covered with an electrocatalytic coating that decreases the overvoltage for generation of hydrogen.

Bipolar Cell—FIG. 2

The concentration of hydroxyl free radicals decreases rapidly with distance from the surface of the anode, because the hydroxyl free radicals react with each other. Therefore, the reaction of contaminants dissolved in the water with hydroxyl free radical produced at the surface of the anode takes place very close to the surface of the anode. When the concentration of contaminants in the water is small, as will often be the case in pollution control applications, the kinetics of the process will be limited by the rate of diffusion of substrate molecules toward the surface of the anode. Accordingly, the electrochemical cell must be designed to maximize the rate of mass transfer. Increasing the surface area of the anode and causing water flow at the surface of the anode to be turbulent contribute to increasing the rate of mass transfer.

The preferred embodiment of the electrochemical cell is a bipolar cell which includes a plurality of bipolar electrodes assembled in an array as illustrated in FIG. 2. The bipolar cell provides moderately large electrode surface area and good mass transfer. Only three of the plurality of bipolar electrodes in the cell are shown for purposes of clarity. One side of each bipolar electrode serves as the anode 62; the other side serves as the cathode 64. The surface of the anode is coated with an oxide coating including $TiO_2$ and also $NbO_2$ or $TaO_2$. The preferred mole fraction of (Nb+Ta) in the oxide coating is 2 to 6 percent. The surface of the cathode may be the same or may be different, if that is advantageous to the process. Hydroxyl radical 66 produced at the surface of the anode 62 will diffuse into the solution. Hydroxyl free radicals will react with chemical substances dissolved in the water and oxidize them. The hydrogen peroxide produced at the cathode 68 will contribute to the oxidation of organic compounds. Free radicals produced by reaction of hydroxyl free radicals with organic molecules will react with hydrogen peroxide and with oxygen dissolved in the water.

It is desirable to maintain the water in the cell near saturation with atmospheric oxygen, in order to allow hydrogen peroxide to be produced at the cathode, and to allow reactions of free radicals with dissolved oxygen. Saturation with air is most readily accomplished by aerating the water within the cell.

The current density at the cathode may exceed the supply of molecular oxygen to the surface of the cathode by diffusion; in this case, the current in excess of that which reduces molecular oxygen will reduce hydrogen ion to molecular hydrogen 70 or to atomic hydrogen. It may be advantageous to place an electrocatalytic coating on the surface of the cathode in order to decrease the overvoltage for formation of hydrogen. Doing so will decrease the energy requirements to operate the cell, and also will decrease the tendency toward hydriding and embrittlement of the electrode.

The last electrode at one end of the array is connected to the negative pole 72 of a source of electric current. The last electrode at the opposite end of the array is connected to the positive pole 74 of a source of electric current.

The array of electrodes is mounted in a suitable housing 76 or assembly which supports the electrodes, and allows the water to be purified 78 to flow between them. It may be necessary to add sodium carbonate or another electrolyte 80 to the water to increase its electrical conductivity, or to control its pH.

If the concentration in the water of substrates is small, the process will operate in the "diffusion limited regime".

Turbulence and thereby also mass transfer may be increased by increasing the velocity of water flowing past the electrodes. Recirculating the water 82 through the bipolar array is the simplest way to increase the water flow velocity. In most cases, the velocity of water flowing past the electrodes will be much larger than the through-put of the cell. The recirculation pump 84 powers the recirculation of the water. Scratching, embossing, patterning or otherwise roughening 86 the surface of the electrodes prior to coating them will help increase the turbulence of water flowing between the electrodes in the bipolar array. A plastic mesh or other turbulence inducing device may be placed between the bipolar electrodes (not shown).

The water is aerated by injecting air 88. Because the water is recirculated within the cell, the air may be injected either before or after the bipolar array of electrodes. Injecting air downstream of the electrodes will decrease or eliminate the movement of air bubbles between the closely spaced electrodes, where the air bubbles might interfere with water flow or increase the effective electrical resistance of the water. On the other hand, passage of some amount of air bubbles between the electrodes will increase turbulence of the water therein, and may improve mass transfer to some degree.

The purified water 90 flows out of the cell.

Production of the Electrodes Using an Organic Coating Solution—FIGS. 3 and 4

The manufacturing process for the coated electrodes using an organic coating solution is diagrammed in FIG. 3. Examples 1, 2 and 3 relate to FIG. 3. The metallic substrate is manufactured by stamping, machining or other appropriate metal-forming means 20. The substrate is washed or degreased 22 as necessary to remove superficial contaminants. The substrate is etched or polished 24 to remove the superficial oxide layer. If the substrate is polished rather than etched, it will be washed again after being polished. The organic coating solution is applied 26 to the substrate or electrode by brushing, spraying, dipping or other appropriate means. The electrode is heated in air 28 for seven minutes at 450° C., and allowed to cool 30. Steps 26, 28 and 30 are repeated a number of times sufficient to produce an oxide coating with the thickness desired. Finally, the electrode is annealled at 650° to 800° C. for 30 to 60 minutes 30 under hydrogen including a small amount of water vapor.

FIG. 4 depicts the apparatus used to anneal the electrodes under an atmosphere of hydrogen including a small amount of water vapor. The furnace 40 is set to a temperature between 650° and 800° C. The electrodes are contained in a stainless steel capsule 42. The supply of hydrogen is provided using a gas cylinder 44, equipped with a pressure regulator 46. The flow rate of hydrogen is controlled by a metering valve 48, and measured using a flow meter 50. Before reaching the capsule that contains the electrode 42, the hydrogen gas passes through a capsule 52 containing some $TiO_2$ powder (anatase, rutile, or amorphous $TiO_2$), where it picks-up a small amount of water vapor that is formed by reaction of the $TiO_2$ powder with the hydrogen. The required amount of water vapor may be added to the hydrogen in other ways; for example, by bubbling part of the hydrogen going into the apparatus through water.

FIG. 5: Production of Electrodes Using Aqueous Coating Compositions

Example 8 relates to FIG. 5. The metallic substrate is manufactured by stamping, machining or other appropriate metal-forming means 20. The substrate is washed or degreased 22 as necessary to remove superficial contaminants. The substrate is etched or polished 24 to remove the superficial oxide layer. If the substrate is polished rather than etched, it will be washed again after being polished. The aqueous coating slurry including a reactive slurry of $TiO_2$ and ammonium niobate is applied 34 to the substrate or electrode by brushing, spraying, or other appropriate means. The electrode is heated in air 35 for three minutes at 250° C., and allowed to cool 36. Steps 34, 35 and 36 are repeated a number of times sufficient to produce an oxide coating of thickness advantageous to the purpose. Then an aqueous coating solution including a water soluble titanium compound and ammonium niobate is applied 37 to the electrode by brushing, spraying, dipping, or other appropriate means. Then the electrode is heated 38 in air at 450° C. for 20 minutes. Then the electrode is annealled at 800° C. for sixty minutes 39 under 0 hydrogen including a small amount of water vapor, utilizing the apparatus depicted in FIG. 4.

After the steps described above, the electrode has good conductivity and good current yield of hydroxyl free radical, but the coating is chalky and and part of it rubs off easily. One or more additional coats of aqueous coating solution are applied 56 and the electrode is heated in air 58 at 450° C. for 25 minutes after each coat. Finally, the electrode is again annealled 59 under hydrogen including a small amount of water vapor for sixty minutes at a temperature anywhere between 650° and 800° C. The additional coating and reannealling makes the oxide coating much harder and greatly decreases "chalking" while not adversely affecting the electrochemical performance of the electrode. The cycle of recoating and reannealling may be repeated as needed to further improve the texture of the oxide coating.

FIG. 6: Porous Anode Cell

The maximum anode surface area is provided by using a porous anode, preferably comprising a metallic substrate formed of Ti-metal fibers, sintered or welded or otherwise fused at their contact points to produce a physically coherent and electrically conductive structure, and said metallic substrate is coated with an oxide coating of the appropriate composition. In the funished anode, each metal fiber is covered with a thin oxide coating comprising titanium dioxide with an admixture of Nb or Ta in the +4 valence state. A metallic substrate made of sintered or otherwise fused Ti-metal particles may also be used. The porous anode may also comprise particles of the appropriate mixed metal oxide material, fused by deposition of the oxide coating upon and between the particles.

Using a substrate made of sintered Ti-metal fibers or very fine wires provides a large surface area in relation to the weight of the metal, and the permeability of the resulting anode is high. Also, the resulting anode is easy to cut and is not fragile. The sintered Ti-metal fiber substrate is preferably made in the form of a thin sheet, with thickness 1 to 3 millimeters most advantageous to the purpose. If water of low electrolyte content is being purified, the voltage drop in the electrolyte within the porous anode may be substantial, and the current density at the surface of the fibers will be much larger near the surface of the porous anode than in the middle. In this case, the thin sheet geometry is preferred, because it allows more uniform current density throughout the volume of the porous anode.

The porous anodes are assembled in an array in the porous anode cell depicted in FIG. 6. The porous anode cell comprises at least one porous anode 95 and at least one permeable cathode 93, and is contained within housing 96, and said housing is fabricated of an electrically nonconductive material, preferably one of the polyolefin plastics. The porous anodes 95 are connected to the positive pole 74 of a source of electric current, while permeable cathodes 93 are connected to the negative pole 72 of a source of electric current. Water flows into 78 the housing, flows through the stack of electrodes, and flows out 90 of the other end of the housing. Porous anodes 95 and permeable cathodes 93 alternate in the array with permeable electrically nonconductive separators 94 placed between them to prevent an electrical short circuit. Separators 94 preferably consist of a fine plastic mesh, but glass or plastic textiles or similar porous nonconductive materials would also serve. Before reaching the electrodes, the water passes through prefilter which removes suspended particles from the water and thereby prevents clogging of the porous anodes and nonconductive separators. Perforated end plates 91 hold the other components in place and pressed together, while allowing water to flow through the porous anode cell.

FIG. 7: Comparison of Electrode Annealled Under Hydrogen With An Electrode Not So Annealled FIG. 7 relates to Example 1. Two electrodes were coated using an organic coating solution as depicted in FIG. 3. One electrode was annealled under hydrogen including a small amount of water vapor in the apparatus depicted in FIG. 4, and passed a useful current 100 when subsequently tested using cyclic voltammetry. The other electrode was not annealled under hydrogen, and passed current 102 approximately one hundred times smaller than the current passed by the electrode that had been annealled under hydrogen.

FIG. 8: Log Current Density vs. Anode Potential for Electrodes Coated Using Organic Coating Solutions Electrode 130 was prepared as described in Example 1. Electrode 132 was prepared as described in Example 2. Electrode 134 was prepared as described in Example 3.

FIG. 9: Log Current Density vs. Anode Potential for Electrodes Produced Using Aqueous Coating Solutions Including 4 and 100 Mole Percent Nb Electrode 140 was prepared following Example 4, using an aqueous coating solution that included 4 mole percent Nb. Electrode 142 was prepared following Example 5, using an aqueous coating solution that included 100 mole percent Nb. In neither case did the aqueous coating solution include a reactive slurry of $TiO_2$.

FIG. 10: Log Current Density vs. Anode Potential for Electrodes Produced using Aqueous Coating Slurries Including 4 to 100 Mole Percent Nb A series of five electrodes were prepared as described in Example 8, using aqueous coating slurries and aqueous coating solutions following the procedure in FIG. 5. Each electrode was tested using cyclic voltammetry. The results for each electrode are labeled with the corresponding percent mole Nb.

FIG. 11—Process for Producing Ammonium Niobate

While FIG. 11 depicts a continuous process, the process will more likely be operated in batch mode, because process throughput probably will be small, and certain unit operations are better suited to batch operation (fusion, precipitation, sublimation). FIG. 11 is to be construed as describing the corresponding batch-mode process as well. In FIG. 11, the reference numerals 174, 174A, 172, and 172A identify points in the process where concentrated ammonium hydroxide and water are recovered from the process and where they reenter the process, not necessarily direct connections from source to point of consumption.

A solution including potassium niobate is provided 150, preferably including 15-30 w/v% $Nb_2O_5$. This solution is preferably produced using the potassium carbonate fusion process or the potassium hydrogen sulfate fusion process. In the potassium carbonate fusion process $Nb_2O_5$ is fused with potassium carbonate 144, and the product of the fusion reaction is dissolved in water 145 to produce a solution that includes potassium niobate and potassium carbonate 150. The potassium carbonate used in the fusion reaction comes from the primary nonvolatile salt residue 190 which also includes some potassium niobate. Thus, potassium carbonate is completely recycled, and the conversion efficiency of $Nb_2O_5$ to ammonium niobate is nearly 100%.

In the potassium hydrogen sulfate fusion process, $Nb_2O_5$ is fused with $KHSO_4$ 146, and the product of the fusion reaction is leached with water 147 to extract $KHSO_4$ and precipitate niobic acid. The niobic acid is dissolved in potassium hydroxide 149 to produce a solution that includes potassium niobate and a small amount of excess KOH. The $KHSO_4$ is recovered 148 and reused.

The primary reagent solution 178 is added to the solution including potassium niobate in a volume ratio not less than one to produce the primary reaction mixture. The primary ammonium niobate precipitate spontaneously precipitates 152 from the primary reaction mixture. The primary spent solution is separated from the primary ammonium niobate precipitate by filtration, centrifugation, or other suitable means 154.

The primary ammonium niobate precipitate is dissolved 156 in water 174A. Adding make-up water 158 at this point causes the volume of the final product ammonium niobate solution 166 to exceed the volume of the solution including potassium niobate 150. Adding makeup water 158 also causes the volume ratio of primary reagent solution to the solution including potassium niobate in the primary precipitation step 152 to be greater than the corresponding volume ratio in the secondary precipitation step 160, whereby the concentration of ammonium hydroxide in the primary reaction mixture is increased, and more complete precipitation of ammonium niobate from the primary reaction mixture is affected, thereby decreasing the amount of $Nb_2O_5$ ultimately going to reprocessing or disposal 190.

The secondary reagent solution is prepared 184 by combining ammonium hydroxide 172A and purified ammonium salt 182 recycled 180 from the primary spent solution, and ammonium salt is added to make up for ammonium salt consumed in the reaction cycle 186. The secondary reagent solution is combined with the solution of ammonium niobate produced in step 156 in volume proportion preferably no less than one to produce the secondary reaction mixture, whereupon the secondary ammonium niobate precipitate spontaneously forms 160. The secondary ammonium niobate precipitate is separated from the secondary spent solution by filtration, centrifugation, or other appropriate means 154A. The secondary ammonium niobate precipitate is dissolved in water 162, and the resulting solution is clarified 164 filtration or other appropriate means to produce the final product solution of ammonium niobate 166 which includes very little potassium. Any tantalum present in the starting material will end up in the final product solution as ammonium tantalate. The solid 168 removed in the clarification step 164 will include any insoluble impurities; for example, the oxides of Ti, Zr and Fe. A small fraction of the $Nb_2O_5$ in the process (<2%) may also end up here.

The secondary spent solution is recycled 170 to recover concentrated ammonium hydroxide 172 and to remove water 174 by distillation or other appropriate means. The secondary salt residue 176 includes most of the ammonium salt that was present in the secondary reagent solution 184 and the small amount of potassium that was separated from the secondary ammonium niobate precipitate in the second precipitation step 160. It also includes the Nb that failed to precipitate in step 160 followed by liquid-solid separation step 154A, equivalent to 5-10% of total $Nb_2O_5$ in the process. The recovered ammonium hydroxide 172 and the secondary salt residue are combined to make the primary reagent solution 178. The Nb content of the secondary spent solution is thereby returned to the process, and the amount of K introduced to the primary reaction mixture by this route is much smaller than the amount of K that comes with the solution including potassium niobate 150.

The primary spent solution is also recycled 180 to recover concentrated ammonium hydroxide 172A and water 174A by distillation or other appropriate means. The ammonium salt remaining in the primary salt residue may be recovered by distillation or sublimation, and returned to the process 182.

In the claims, "primary residual solution" is the product of recovering concentrated ammonium hydroxide from the primary spent solution. Removing water from the primary residual solution converts it to primary residual salt. "Secondary residual solution" has an analagous meaning.

The primary nonvolatile salt residue 188 includes the potassium salt byproduct of the reaction cycle, soluble impurities, and some amount of potassium niobate that failed to precipitate in the primary precipitation step 152. If the ammonium salt employed is ammonium carbonate, the primary nonvolatile salt residue will consist of potassium carbonate with an admixture of potassium niobate, and will be returned to the fusion reaction 144, allowing complete reuse of potassium carbonate. If ammonium acetate is employed, the nonvolatile salt residue may be reprocessed further to recover $Nb_2O_5$ and acetic acid, or it may be disposed as waste 192.

Operation—Method used to evaluate electrode coatings

When the various coating methods were evaluated and compared, a standard test electrode geometry and a standard test protocol were used. Test electrodes were fabricated of 0.25"=0.635 cm diameter rod of Ti-Gr.2, and coated. Part of the oxide coating was then removed, leaving a coated area of 7.6 cm² which served as the electrochemically active anode. (Uncoated portions of the electrode conduct very little current, because they quickly develop an insulating oxide layer when anodically polarized.)

The data in FIGS. 7 to 10 were generated using the test electrodes described in the preceding paragraph, and the procedure described below.

A graphite block with a 1.905 cm=0.75" diameter hole drilled in it served as the body of the test cell, and also as the cathode. A 0.2 M solution of sodium bicarbonate served as the electrolyte, and air including 10% carbon dioxide was bubbled through the electrolyte to maintain pH near 8. The anode was rotated at about 550 to 600 RPM.

The test electrodes were subjected to a standardized test procedure utilizing cyclic voltammetry. The potential imposed on the electrodes was ramped from 1.55 v to 3.45 v vs. standard hydrogen electrode (SHE) over a period of 10 minutes, held at 3.45 v for one minute, ramped back down to 1.55 v over 10 minutes, held for 1 minute at 1.55 v, and the entire cycle was repeated for a total of one to four complete cycles while periodically recording the values of current and anode potential. The results were plotted as log I/A (logarithm of current/coated area of the electrode) vs. anode potential. In some cases cell voltage was also recorded.

In nearly all cases, the current on the up ramp was larger than the current on the down ramp at the same potential. The down ramp was nearly the same from cycle to cycle, and is considered to be a reproducible characteristic. In FIGS. 7 to 10, the current on the down ramp of the second or third cycle is presented.

Galvanostatic tests were also performed to determine the current yield of hydroxyl free radical by passing a current=152 mAmp through an electrolyte including sodium formate for 30 minutes and measuring the concentration of formate remaining in solution as a function of time. Assuming that exactly two hydroxyl radicals are required to oxidize one formate ion allowed the current yield of hydroxyl free radical to be determined from this data. In nearly all cases, the current yield was determined to be 0.5-0.6 moles of HO. produced per Faraday of electrons (that is, mole of electrons) passed through the cell.

OPERATION—EXAMPLES

EXAMPLE 1

The detailed preparation of two rectangular anodes using an organic coating solution is described in detail.

These anodes were used in Examples 1 and 2 described in the above identified related application. They were coated on one side only with TiO$_2$ doped with niobium. The mole fraction of niobium in the oxide coating is approximately four percent.

(1) The metallic substrates were sized 21 mm×98 mm, cut from 1.0 mm thick Ti Grade 1 sheet.

(2) The substrates were sanded on both sides using No. 150 alumina (yellow) sand-paper to remove the mill oxide.

(3) Then they were washed using laboratory detergent and warm water, sonicated for five minutes in deionized water, rinsed with acetone, and allowed to dry.

(4) Stock Solution was prepared by combining:
0.776 g NbCl$_5$
3.75 mL 12N HCl
50 mL n-Butanol (5) Coating solution was prepared by combining:
10 mL stock solution (#4 preceding)
5 mL Titanium n-Butoxide, Ti(OCH$_2$CH$_2$CH$_2$CH$_3$)$_4$ (6) Using a small cotton-tipped swab, the electrodes were coated with the coating solution.

(7) They were then placed inside a furnace at 450° C. and heated in air for seven minutes.

(8) After seven minutes, they were removed from the furnace and allowed to cool to near room temperature.

Steps (6), (7) and (8) were repeated ten times total, using a fresh swab each time.

(9) Finally, the coated electrodes were annealled under hydrogen at 650° C. for 30 minutes using the apparatus depicted in FIG. 4. The hydrogen gas passed through a stainless steel capsule containing one gram of TiO$_2$ powder (rutile, in this case, but anatase serves as well) before entering the capsule containing the electrodes. Hydrogen flow rate was set to 185 mL/minute before turning on the furnace, and was left on during the entire heat/soak/cool cycle.

Test electrodes (0.635 cm dia. rods) were coated following the same procedure. Electrode 100 in FIG. 7 and electrode 130 in FIG. 8 were prepared as described above. Electrode 102 in FIG. 7 was produced the same way, except that step 9 (annealling) was omitted. The peak current density of electrode 130 in FIG. 8 was 23 mAmp cm$^{-2}$.

All electrodes coated using the organic coating solutions were uniform dark grey or blue-grey in color, with a matte or semi-matte appearance. To the naked eye the oxide coating was featureless and opaque.

EXAMPLE 2

A solution of niobium (V) n-butoxide in n-butanol was prepared by combining 5.00 g of niobium (V) ethoxide with 43 mL of n-butanol in a round bottom flask attached to a distillation column and condenser, and slowly distilling the mixture to drive off ethanol until the reflux temperature reached 95° C. Niobium (V) ethoxide may be purchased from Alfa/Johnson Matthey, Aldrich Chemical, Cerac, and other chemical suppliers. The equivalent concentration of Nb$_2$O$_5$ in the resulting solution was 5.0 w/v%, determined gravimetrically. 1.00 mL of the solution was pipetted into a tared Inconel crucible, and 0.10 mL of water was added with swirling to decompose niobium butoxide to amorphous niobium pentoxide. The crucible was carefully heated over an alcohol flame to ignite the butanol fumes, and after the butanol had burned off, the crucible was briefly heated to orange heat over a propane torch, allowed to cool, and weighed to determine the amount of Nb$_2$O$_5$ present.

An organic coating solution was made by combining:
6.63 g of Titanium n-Butoxide, Ti(OCH$_2$CH$_2$CH$_2$CH$_3$)$_4$
8.57 g of n-Butanol
2.14 mL solution of Niobium n-Butoxide in n-Butanol, containing 5.0 w/v% Nb$_2$O$_5$ Test electrodes were coated using this solution and the procedure described in Example 1 above. The conductivity of electrode 132 in FIG. 8 was 22 mAmp cm$^{-2}$, practically identical to electrodes produced using the organic coating solution including HCl described in Example 1 above; for example, electrode 130 in FIG. 8. Adding a few percent of acetic acid or formic acid to the recipe had no effect upon the electrodes resulting.

The organic coating solutions described in Examples 1 and 2 require that about ten coats be applied to guarantee complete coverage of the surface of the metal and achieve a coat weight of 2–3 mg cm$^{-2}$. Electrodes coated with less than ten coating cycles sometimes had small bare spots where the coating evidently had not adhered. Decreasing the amount of n-butanol in the coating solution greatly increased the viscosity of the solution which resulted in a much heavier coat, but with very poor adhesion.

EXAMPLE 3

Several organic coating solutions were formulated using partially polymerized titanium (IV) butoxide. The best of these solutions, including 4 mole percent Nb, was formulated using:
9.95 g titanium n-butoxide
3.24 mL Nb(V) butoxide solution containing 5 w/v% Nb$_2$O$_5$
1.32 mL glacial acetic acid
0.66 mL water
15 mL isopropanol containing not more than 0.2 v/v% water The titanium butoxide was combined with the niobium butoxide solution in a round bottom flask fitted with a distillation column and condenser. The water was added to the isopropanol, and this mixture was slowly added to the flask with vigorous stirring. Then isopropanol was boiled off with refluxing until the reflux temperature increased to about 95° C. The flask was cooled and weighed, and 0.75 mL of n-butanol was added to replace the n-butanol that was lost with the isopropanol. Finally, the acetic acid was added. The amount of water added plus the estimated water content of the isopropanol was sufficient to polymerize the titanium butoxide to the extent of 62.5%. This chemical reaction may be expressed as:

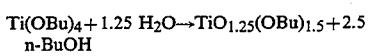
$$Ti(OBu)_4 + 1.25\ H_2O \rightarrow TiO_{1.25}(OBu)_{1.5} + 2.5\ \text{n-BuOH}$$

Additional n-butanol was not added, because the amount introduced with the niobium (V) butoxide plus that released by the chemical reaction dilutes the solution sufficiently.

A test electrode was coated using this solution and the procedure in Example 1, producing a coat weight of 2.7 mg cm$^{-2}$ after just five coats. This electrode (134 in FIG. 8) had peak current density=37 mAmp cm$^{-2}$, larger than observed with the electrodes coated using the organic coating solutions described in Examples 1 and 2.

This recipe is preferred among the organic coating solutions, because it allows an adherent, complete oxide coating to be applied with a minimum number of coating cycles, thereby minimizing labor and the amount of n-butanol that must be evaporated during the coating process and then recovered for reasons of operational safety and environmental protection. Of all the organic coating solutions, it also produced the best electrodes.

Decreasing the amount of n-butanol in organic coating solutions of this kind increased viscosity and produced a thick, but poorly adherent coating. Adding anatase powder to the solution to increase the total content of $TiO_2$ by more than about 50% likewise produced thick, poorly adherent coatings.

EXAMPLE 4

The aqueous coating solution including 4 mole percent Nb was made by combining 5.00 mL Tyzor LA ®
0.54 mL Ammonium niobate solution containing 10.6 w/v% $Nb_2O_5$
0.20 mL 0.5 v/v% solution of Triton X-100 ®
4.26 mL Water This solution is clear and stable, and wets a polished Ti-metal surface. A test electrode was coated four times with this solution. Each time, the electrode was dipped into the solution and then heated in air for 10 minutes at 450° C. Finally, the electrode was annealed under hydrogen including a small amount of water vapor in the apparatus depicted in FIG. 4 at 800° C. for 60 minutes.

The resulting coat was thin, vitreous looking, and well adherent, with coat weight=0.7 mg $cm^{-2}$. The appearance of the coat was very different from those obtained using the organic coating solutions (Examples 1 to 3) or the aqueous coating slurries (Example 8). The vitreous appearance suggests that the coat was amorphous rather than crystalline.

The peak current density for this electrode (140 in FIG. 9) was 7 mAmp $cm^{-2}$. The peak current density was much less than obtained with the organic coating solutions (Examples 1 to 3) or with the aqueous coating slurries (Example 8), and the shape of the curve was different (compare FIG. 9 with FIGS. 8 and 10); log I/A decreased rapidly as anode potential was decreased below the peak potential.

This recipe may be modified to produce an oxide coating including less or much more Nb by varying the proportions of Tyzor LA ® and ammonium niobate.

EXAMPLE 5

An oxide coating consisting predominantly of niobium dioxide was also produced. The aqueous coating solution was made by combining:

3.00 mL Ammonium niobate solution containing 10.6 w/v% $Nb_2O_5$
0.10 mL 0.5 v/v% solution of Triton X-100 ®

Four coats were applied to a test electrode, giving a final coat weight=0.8 $cm^{-2}$. Each coat was applied by dipping the electrode into the coating solution and then heating it in air at 250° C. for 3 minutes, sufficient to decompose the ammonium niobate to $Nb_2O_5$. Finally, the electrode was annealed under hydrogen including a small amount of water vapor in the apparatus depicted in FIG. 4 at 800° C. for 60 minutes.

The coat had a vitreous appearance similar to the coat obtained in Example 4, but was somewhat softer than the coat obtained in Example 4. The peak current for this electrode (142 in FIG. 9) was 10 mAmp $cm^{-2}$, and the shape of the curve was very similar to that obtained with electrode 140 in Example 4.

EXAMPLE 6

A solution of ammonium niobate in water was prepared as follows:

(1) Mix 5 g of powdered $Nb_2O_5$ with 20 g of $KHSO_4$.

(2) Heat above mixture until the potassium hydrogen sulfate melts, reacts with the niobium pentoxide and loses water, finally producing a clear yellow liquid. The fusion reaction starts at about 300° C., and is most conveniently performed in a borosilicate glass tube.

(3) Pour liquid on to a cooling plate to solidify it, then crush and grind it into a powder. Allowing for loss of water during the fusion, this powder includes 21.3% $Nb_2O_5$.

(4) Combine 10 g of powder from step 3 with 30 mL water, shake to mix well, allow a few minutes for reaction, centrifuge, and decant the liquid. This reaction produces a voluminous precipitate of niobic acid. Wash precipitate twice more by adding water, shaking, and centrifuging. The liquid from this step may be evaporated to recover potassium hydrogen sulfate.

(5) Add 9.0 mL of 3N KOH solution to the precipitate from step 4, shake, and heat until precipitate is mostly dissolved. The resulting solution includes potassium niobate ($K_8Nb_6O_{19}$) and a 25% excess of KOH, and its volume is approximately 15 mL due to water introduced with the niobic acid.

(6) Prepare a 3N solution of ammonium carbonate in concentrated ammonium hydroxide (14.4N). Prolonged stirring may be required for the solid to dissolve completely. 3N ammonium acetate may also be used, and is easier to prepare.

(7) Add 15 mL of 3N ammonium carbonate or 3N ammonium acetate to the solution from step 5 to precipitate ammonium niobate, centrifuge, and discard the spent solution or set it aside for recycling.

(8) Dissolve precipitate from step 7 in 15 mL water. The resulting solution includes a mixture of ammonium niobate and potassium niobate, wherein the mole ratio K/Nb≈0.14.

(9) Repeat steps 7 and 8. The resulting solution now includes practically pure ammonium niobate.

(10) The solution from step 9 may be centrifuged or filtered to remove a small amount of solid material that may be present.

The $Nb_2O_5$ content of the ammonium niobate solution may be determined gravimetrically by evaporating and calcining (to orange heat) 1.00 mL of the solution in a tared crucible made of Inconel or another suitable material, then cooling and weighing the crucible. The residual potassium content may be determined by crushing and slurrying the ash in a few milliliters of water, then titrating the slurry with 0.01N HCl to the endpoint of methyl red.

The procedure described above produced a solution of ammonium niobate with concentration equivalent to approximately 100 mg $Nb_2O_5$ per milliliter (10.0 w/v%) and mole ratio K/Nb≈0.003%. The conversion of $Nb_2O_5$ to ammonium niobate was 79%. Nearly all of the unrecovered $Nb_2O_5$ is present in the spent solutions from steps 7 and 9 which include about 0.65 w/v% $Nb_2O_5$ due to incomplete precipitation of ammonium niobate.

In the primary ammonium niobate precipitate produced during the first precipitation reaction (step 7 above), $K/Nb \approx 0.14$ and in the primary spent solution $K/Nb \approx 0.86$; therefore, the apparent equilibrium constant $$K_{dist} = \frac{[K]_{liq} X_{NH_4,solid}}{[NH_4]_{liq} X_{K,solid}} \approx 6$$

In fact, a substantial fraction of the potassium determined in the precipitate probably came from entrained liquid, and $K_{dist} > 6$. It is obvious that the ammonium niobate precipitate rejects potassium, and for this reason a single purification step is sufficient to separate virtually all of the potassium.

EXAMPLE 7

"TiO$_2$ slurry #1" was the reactive slurry of TiO$_2$ used to prepare the four electrodes in FIG. 10 with mole ratio Nb=6.25% to 50%. It was prepared by mixing Kemira Unitane 908 with an equal weight of water and adjusting the pH of the mixture to about 9.8 using concentrated ammonium hydroxide. The content of TiO$_2$ determined by drying, calcining, and measuring weight loss, was 37 w/w%.

"TiO$_2$ slurry #2" was the reactive slurry of TiO$_2$ used to prepare the electrode in FIG. 10 with mole ratio Nb=4%. It was made by dispersing 100 g of Unitane 908 in 500 mL of 1N ammonium hydroxide, heating and stirring at about 90° C. for one hour, and finally adding water, centrifuging, and decanting three times to remove excess ammonium hydroxide and other soluble impurities. The TiO$_2$ content was 47 w/w%, determined gravimetrically.

EXAMPLE 8

The coating procedure used in this Example is depicted in FIG. 5. A series of four aqueous coating slurries were made according to these recipes:

TABLE 8-1

| Mole frac. Nb (%) | TiO$_2$ slurry #1 37 w/w % TiO$_2$ (g) | NH$_4$NbO$_3$ 10.6 w/v % Nb$_2$O$_5$ (mL) | 0.5 v/v % Triton X-100 (ml) | Water (mL) |
|---|---|---|---|---|
| 6.25 | 2.71 | 1.04 | 0.1 | 1.15 |
| 12.5 | 2.71 | 2.23 | 0.1 | 0 |
| 25 | 2.71 | 5.21 | 0.1 | 0 |
| 50 | 0.50 | 2.89 | 0.1 | 0 |

A fifth aqueous coating slurry was made according to this recipe:

TABLE 8-2

| Mole frac. Nb (%) | TiO$_2$ slurry #2 37 w/w % TiO$_2$ (g) | NH$_4$NbO$_3$ 8.5 w/v % Nb$_2$O$_5$ (mL) | 0.5 v/v % Triton X-100 (ml) | Water (mL) |
|---|---|---|---|---|
| 4 | 4.26 | 1.56 | 0.1 | 2.08 |

A series of four aqueous coating solutions corresponding to the aqueous coating slurries in Table 8-1 were made according to these recipes:

TABLE 8-3

| Mole frac. Nb (%) | Tyzor LA ® 16.6 w/v % TiO$_2$ (mL) | NH$_4$NbO$_3$ 10.6 w/v % Nb$_2$O$_5$ (mL) | 0.5 v/v % Triton X-100 (ml) | Water (mL) |
|---|---|---|---|---|
| 6.25 | 4.51 | 0.78 | 0.2 | 4.51 |
| 12.5 | 4.21 | 1.56 | 0.2 | 4.03 |
| 25 | 1.80 | 1.56 | 0.1 | 1.54 |
| 50 | 1.20 | 3.12 | 0.1 | 0.58 |

A fifth aqueous coating solution corresponding to the aqueous coating slurry in Table 8-2 was made according to this recipe:

| Mole frac. Nb (%) | Tyzor LA ® 16.6 w/v % TiO$_2$ (mL) | NH$_4$NbO$_3$ 6.7 w/v % Nb$_2$O$_5$ (mL) | 0.5 v/v % Triton X-100 (ml) | Water (mL) |
|---|---|---|---|---|
| 4 | 4.26 | 0.74 | 0.15 | 5.00 |

Five test electrodes were coated using the aqueous coating slurries in Tables 8-1 and 8-2. Each coat was applied by swabbing the slurry on to the surface of the electrode using a small cotton-tipped swab, and then baking the electrode for 3 minutes at 250° C. in air, which suffices to throughly dry the coat and decompose the ammonium niobate to Nb$_2$O$_5$. Additional coats were applied until the weight of the oxide coating on each electrode exceeded 1.3 mg cm$^{-2}$. At this stage, the oxide coating was white. The oxide coatings on the electrodes with 4, 6.25 and 12.5% mole fraction Nb were quite soft and chalky, while the oxide coatings with 25 and 50% Nb were harder.

The five electrodes were then additionally coated by dipping them briefly into the aqueous coating solutions of corresponding mole fraction Nb in Table 8-2, and then heating for 20 minutes at 450° C. in air to decompose the titanium chelate (Tyzor LA) and ammonium niobate to an amorphous mixture TiO$_2$ and Nb$_2$O$_5$. (The higher temperature and longer time are needed to decompose and burn off the lactic acid from the Tyzor LA.) After this "first overcoat", the oxide coatings were harder and much less chalky than before. The oxide coating of the 4% electrode was harder than the 6.25% electrode, probably due to the use of "TiO$_2$ slurry #2" instead of "TiO$_2$ slurry #2" in the recipe in Table 8-2.

The electrodes were then annealled at 800° C. for 60 minutes under hydrogen including a small amount of water vapor in the apparatus in FIG. 3. After the anneal, the electrodes were irregularly colored ranging from very dark blue to dark pastel blue, and the oxide coatings were chalky, but harder with increasing mole fraction Nb.

The electrodes were again dipped into the aqueous coating solutions of corresponding mole fraction Nb in Tables 8-3 and 8-4, and baked in air for 25 minutes at 450° C. At this point, the electrodes were all quite hard and no longer chalky. The blue color was unchanged. Then the electrodes were annealled again under hydrogen including a small amount of water vapor at 650° C. for 60 minutes in the apparatus in FIG. 3. After reannealling, the oxide coatings were slightly chalky at the smaller mole ratios, but much harder than after the first anneal. The oxide coatings at 25 and 50% Nb were quite hard.

The cyclic voltammetry test results for these electrodes are presented in FIG. 10. The peak current densities at 3.45 v anode potential were:

TABLE 8-5

| Mole frac. Nb (%) | Current Density at 3.45 v (mAmp cm$^{-2}$) |
|---|---|
| 4 | 34 |
| 6.25 | 22 |
| 12.5 | 35 |
| 25 | 34 |
| 50 | 17 |

While the 6.25% Nb curve is slightly anamolous, the cyclic voltammetry test data in FIG. 10 and Table 8-5 follow a clear pattern:

(a) Current density decreases with increasing mole fraction Nb in the oxide coating.

(b) The current density curves for the different mole fractions converge at the highest anode potential. The difference between them increases as the anode potential is decreased.

This behavior is discussed further in the section "Conclusions, Ramifications and Scope".

EXAMPLE 9

A bulk material consisting of $TiO_2$ with a 4 mole percent admixture of $NbO_2$ was synthesized starting with anatase pigment of particle size less than 300 nm and niobic acid made by fusing $Nb_2O_5$ with $KHSO_4$, decomposing the fused mixture with water, and washing the precipitate. Niobic acid was dissolved in an excess of oxalic acid, and the resulting solution was mixed with the anatase powder. The mixture was homogenized, dried at 100°–130° C., and then heated at 600° C. in air to decompose the niobium oxalate. Then the mixture was wetted with distilled water and ground in a planetary mill four hours. The resulting paste was dried at 100° C., and then heated under hydrogen at 1000° C. for two hours to reduce $Nb_2O_5$ to $NbO_2$. The material was then pelletized and heated under vacuum at 1450° C. for six hours. Finally, the pellets were ground and sieved to produce a powder of 40–60 μm diameter. Also, a solid disk was made out of the powder by hot pressing under vacuum. The dimensions of the disk were, 5.1 cm dia. ×0.7 cm thick. X-ray diffraction analysis confirmed that the product consisted of a single phase with the crystal structure of rutile.

A parallel synthesis was performed to produce a disk and a powder consisting of $TiO_2$ doped with 4 mole percent $Nb^{+5}$. The procedure was the same as described in the preceding paragraph, except that the material was not heated under hydrogen. This procedure is similar to those reported by Khodos and others (1988) and Babich and others (1988), and probably gave the same product. The powder and two disks were prepared as with the first material. (Properties reported below are averages for the two disks.)

The two materials were characterized. The apparent porosity of the disks was measured by calculating their density. Their electrical resistivity was measured by pressing them between two pieces of aluminum foil and measuring the resistance between the two "electrodes". The resistivity of the powder was measured when compressed to 3.0 bars pressure with a static weight.

| | Nominal Doping Level | |
|---|---|---|
| | 4 mole % Nb$^{+4}$ | 4 mole % Nb$^{+5}$ |
| Porosity (%) | 25 | 15 |
| Specific resistance: disk (Ω-cm) | 16 | 153 |
| Spec. resistance: powder (Ω-cm) | 4.9 × 10$^8$ | 4.6 × 10$^9$ |

As expected, the resistivity of the reduced material is much smaller than the unreduced material, approximately ten times smaller for the disk as well as the lightly compressed powder. This result confirms that the material is highly doped with Nb$^{+4}$. The resistivity of the powders is measurable but very much larger than the resistivity of the hot pressed disks. When compressed in a screw press to several kbars, the resistivity of the powders approached that of the disks to within a factor of ten. That the unreduced material has resistivity only ten times greater than the reduced material is due to a small degree of reduction caused by loss of oxygen to vacuum at the high temperature. The ratio of their resistivities suggests that the nominally unreduced material is actually reduced to the extent of approximately 10%.

EXAMPLE 10

Two large rotating electrodes with a cylindrical active surface area of 0.75 inch diameter×2.00 inch high were machined from Ti-Gr. 1 bar stock. One electrode was coated using the procedure described in Example 1 to produce an oxide coating containing 4 mole percent Nb. The second electrode was coated using the same procedure, except that an equimolar amount of tantalum pentachloride was substituted for niobium pentachloride, resulting in an oxide coating that contained 4 mole percent Ta. Both electrodes were tested by cyclic voltammetry and also galavanostatically to determine the current yield of hydroxyl free radicals. The test results for the electrodes were quite similar, demonstrating that Ta may be substituted for Nb in the oxide coatings.

EXAMPLE 11

A test electrode was prepared according to Example 2 in U.S. Pat. No. 4,484,999, except that only the first oxide coating containing Ti and Nb was applied. An aqueous coating solution containing Nb:Ti mole ratio 20:80 was prepared by adding to 25 mL 3N HCl 0.38 g of $NbCl_5$ and 0.60 mL $TiCl_4$. The electrode was etched in 6N HCl at 100° C., washed, weighed, and dried, and then three coats were applied by dipping it into said aqueous coating solution, drying briefly in air, and heating in air at 450° C. for 10 minutes. The coat weight was 0.2 mg cm$^{-2}$ and the oxide coating was transparent light grey and smooth with good adherence. When tested by cyclic voltammetry, the current density at 3.45 v vs. SHE was <0.01 mAmp cm$^{-2}$ the limit of sensitivity of our test apparatus. As in Example 7, we concluded that the prior art electrode is inoperative in the absence of platinum group metals.

Conclusions, Ramifications and Scope

By the present invention, there is provided a coated electrode for use in an electrochemical cell wherein the base metal consists of titanium or a titanium alloy, and the oxide coating includes titanium dioxide with an admixture of niobium, wherein the mole fraction of Nb in the oxide coating is preferably in the range 2 to 6 mole percent, and the coated electrode is annealled under hydrogen in order to anneal the oxide coating and to reduce the niobium pentoxide in the green coating to niobium dioxide, with sufficient water vapor added to the hydrogen to avoid hydriding and hydrogen embrittlement of the titanium metal substrate. Tantalum may be substituted for part or all of the niobium. An electrochemical cell incorporating a bipolar array of these electrodes is also provided, and also a cell utilizing porous anodes with the surface composition specified above.

Several processes for producing the electrodes are provided, as well as a composition of matter that corresponds to the oxide coating of the electrodes, and a manufacturing process for ammonium niobate, which is the preferred source of Nb used in manufacturing the electrodes.

While our description contains many specificities, these should not be construed as limitations on the scope of the invention, but rather as an exemplification of the preferred embodiments thereof. Many other variations are possible, as described in the following paragraphs.

FIG. 10 shows that current density increases as the mole fraction of Nb in the oxide coating decreases. The current density must drop-off below a certain doping level, due to decreasing conductivity of the oxide coating. Results obtained with electrodes with oxide coatings including less than 4 mole percent Nb indicate that, in fact, the current density is greatest just about 4 mole percent Nb, and drops-off at lower doping levels. Therefore, we consider 2 to 6 mole percent to be the preferred embodiment of our invention.

On the other hand, the oxide coating becomes harder and more adherent as mole fraction Nb increases, due to the excellent cementing properties of ammonium niobate used in the aqueous coating compositions. In applications where hardness and adhesion of the coat must be maximized, oxide coatings in the range 6 to 25 mole percent Nb might be preferred. In fact, we have demonstrated that an oxide coating including $TiO_2$ and $NbO_2$ in practically any proportion will produce an electrode capable of conducting a useful current. In some applications, oxide coating compositions outside of the range 2 to 25 mole percent Nb may be found advantageous, and accordingly a wider composition range is claimed.

As demonstrated in Examples 7 and 11, an oxide coating that contains $Nb^{+5}$ instead of $Nb^{+4}$ is not usefully conductive; that is, when the oxide coating consists of a solid solution of $TiO_2$ and $Nb_2O_5$. Therefore, "mole fraction of additive metal in the +4 valence state relative to total metal" = 100% x $(Nb^{+4}+Ta^{+4})$/$(Ti+Nb+Ta+other metals)$ is the important parameter, rather than "mole fraction of additive metal" = 100% × $(Nb+Ta)/(Ti+Nb+Ta+other\ metals)$ While it is true that these two indicators of oxide coating composition may be nearly equal in a well formulated and well-annealled oxide coating, they need not be; for example, if solid particles of $Nb_2O_5$ are added to an aqueous coating slurry, it is unlikely that annealling will convert them to $NbO_2$ uniformly mixed with $TiO_2$.

The electrodes presented in FIG. 8 all have oxide coatings that contain 4 mole percent Nb, but if FIG. 8 is overlaid on FIG. 10, it is apparent that the curves in FIG. 8 approximate the curves at 6.25 to 25 mole percent Nb in FIG. 10. For this reason, we consider the coating process utilizing aqueous coating slurries (FIG. 5; Example 8) to be the preferred embodiment of the manufacturing process. The difference may be related to a smaller degree of crystallinity of the coatings in FIG. 8, due in part to the lower annealling temperature.

The current density in the electrodes in FIG. 9, which were coated using an aqueous coating solution only, is dramatically smaller than at the same mole fraction Nb in FIG. 10. The oxide coatings of the electrodes in FIG. 9 had a vitreous appearance, suggesting amorphous oxide coating structure, while the electrodes in FIG. 10 had a dull appearance that suggested a predominantly crystalline oxide coating.

While we believe the theoretical explanations in the preceding five paragraphs to be correct, we do not wish to be bound by them.

In the bipolar cell, water flow will be turbulent, and the oxide coating will need to resist the potentially abrasive action of the flowing water and bubbles or particles that may be disperesed in the water. For this reason, it is preferred that the oxide coating applied to bipolar electrodes be well adherent and not chalky. Greater coat weight is also advantageous in this case, because a thicker oxide coating, if well cemented, will endure abrasive action for a longer period of time before it is worn away.

In the preferred embodiment, the metallic substrate consists predominantly of titanium, but other corrosion resistant metallic compositions might be used. The metallic substrate may be fabricated of sheet metal, or may be a machined part, or wire or wire mesh, or a porous structure comprised of sintered particles or fibers, or some other form.

The fluid coating composition including titanium and niobium compounds may be applied to the electrode by dipping, brushing, swabbing, spinning, spraying or by other appropriate means. In order to decompose the coating solution and produce the oxide coating, the electrode may be heated in air in a furnace, by briefly exposing it to a flame, by radiant heating, by ohmic heating, or by other appropriate means. The fluid coating composition can be sprayed on to the electrode while the electrode is simultaneously heated. The coating may be applied multiple times to produce a thicker final coating. The water vapor in the hydrogen necessary to prevent hydriding and embrittlement of the substrate metal may be added to the hydrogen by mixing a small amount of water vapor or oxygen with it. The water vapor may also be added to the hydrogen by passing the hydrogen over titanium dioxide in powder form before contacting it with the electrode. Another metal oxide may be used for this purpose, provided that it add an amount of water vapor to the hydrogen appropriate to the needs of the process. Many variations on this basic procedure are possible. In particular, the time and temperature of heating in air and heating under hydrogen may be varied, and components other than hydrogen and water vapor may be added to the atmosphere in the annealling process.

The exact recipes of the coating compositions may be varied. In particular, titanium complexed with anions other than lactate may be used in the aqueous coating compositions, and niobium complexed with oxalate, lactate, or other organic anions may be used in place of ammonium niobate. Complexes of Ti with organic ligands (for example, Tyzor ® LA) may be added to aqueous coating slurries to improve the adhesion of the green oxide coating.

Reactive slurries of $TiO_2$ from different sources and made in different ways may be used; for example, slurries precipitated from solutions of $TiO_2$ dissolved in concentrated HCl by seeding and heating, or precipitated from solutions of $TiO_2$ in either sulfuric acid or HCl by diluting them with water, or by neutralizing the acid in the solution by adding ammonium hydroxide or some other base. Niobium pentoxide may be coprecipitated together with $TiO_2$; for example, by adding ammonium niobate or niobium oxalate to a solution of $TiO_2$ in sulfuric acid while heating the solution.

In manufacturing coated electrodes using the process in FIG. 5 and Example 8, the number of coats applied using the aqueous coating slurry, the number of coats applied using the aqueous coating solution, and the number of annealling steps may be varied, and they may be applied in different sequences in order to improve the texture and hardness of the oxide coating, and the electrochemical properties of the electrode.

The electrode may be comprised of a mixed metal oxide material with compostion similar to aforesaid oxide coatings but with no metallic substrate. The mixed metal oxide material may be consolidated into a solid body of low porosity by hot-pressing or other appropriate means, and it may be rendered conductive by heating it under hydrogen either before or after hot-pressing. Solid bodies comprised of aforesaid mixed metal oxide material may be prepared for non-electrode applications, where an electrically conductive, highly corrosion resistant and heat resistant material is desired.

There may be provided an electrocatalytically active surface on part at least of the surface of the coating. The catalytically active surface may include a material chosen from the groups platinum group metals or alloys, platinum group metal oxides, lead and lead dioxide.

Oxide coated metal electrodes and mixed metal oxide electrodes may be prepared for applications not requiring generation of hydroxyl free radical; for example, electrodes for use in cathodic protection systems.

The two faces of a bipolar electrode in a bipolar cell may be identical, in which case the bipolar cell may be operated with constant polarity, or with periodic reversals of the polarity. Alternatively, the two faces of the coated electrode may be different, in which case the cell is operated at constant polarity, and the face operated as the anode is coated as described in this application and not covered with an electrocatalytic layer, while the coating on the cathodic side is chosen to decrease operating cell voltage, by applying a different oxide coat, or by putting an electrocatalytic layer over the Nb-doped $TiO_2$.

The cell may be provided with means to accelerate the flow of water past the surface of the electrodes or other means to increase turbulence and improve mass transfer at the surface of the electrode. Turbulence may be increased by placing a nonconductive mesh between the bipolar electrodes, or by other appropriate means.

To our knowledge, we have here disclosed the first useful application of ammonium niobate. Because we have also disclosed a practical method for producing ammonium niobate, it is likely that other useful applications will be discovered now that the material is available.

We claim:

1. An electrode comprising
    (a) a metallic substrate having a surface, and
    (b) an oxide coating covering at least part of said surface of said metallic substrate,
        wherein said oxide coating includes titanium dioxide, and
        said oxide coating also includes an additive metal having valence state,
            wherein said additive metal is selected from the class consisting of niobium and tantalum, and
            wherein said valence state is, and
        wherein mole fraction of said additive metal in the +4 valence state relative to total metal in said oxide coating is at least 0.25 percent but not more than 50 percent.

2. The electrode of claim 1,
    wherein said metallic substrate is selected from the class consisting of titanium and titanium alloys, and
    wherein concentration of platinum group metals in said oxide coating is zero or too small to exert a significant electrocatalytic effect favoring the generation of molecular oxygen or chlorine.

3. The electrode of claim 2,
    wherein mole fraction of said additive metal in the +4 valence state relative to total metal in said oxide coating is at least 0.5 percent.

4. The electrode of claim 3,
    wherein mole fraction of said additive metal in the +4 valence state relative to total metal in said oxide coating is at least 1 percent.

5. The electrode of claim 4,
    wherein mole fraction of said additive metal in the +4 valence state relative to total metal in said oxide coating is in the range 2 to 6 percent.

6. The electrode of claim 5, wherein coat weight of said oxide coating is at least 0.5 milligrams per square centimeter.

7. The electrode of claim 1, wherein said electrode is a porous anode, and
    said metallic substrate comprises a porous and physically coherent structure comprised of metallic elements selected from the class consisting of metallic fibers and metallic particles, and
    wherein metallic elements are fused at their contact points,
    whereby an anode with large surface area is provided.

8. An electrochemical cell including at least one anode and at least one cathode, wherein said anodes comprise
    (a) a metallic substrate having a surface, and wherein said metallic substrate is selected from the class consisting of titanium and titanium alloys, and
    (b) an oxide coating covers at least part of said surface of said metallic substrate, and
        wherein said oxide coating includes titanium dioxide, and
        said oxide coating also includes an additive metal having valence state,
            wherein said additive metal is selected from the class consisting of niobium and tantalum, and
            wherein said valence state is, and
        wherein mole fraction of said additive metal in the +4 valence state relative to total metal in said oxide coating is at least 0.25 percent but not more than 50 percent, and
        wherein concentration of platinum group metals in said oxide coating is zero or too small to exert a significant electrocatalytic effect favoring the generation of molecular oxygen or chlorine.

9. The electrochemical cell of claim 8,
wherein mole fraction of said additive metal in said oxide coating is in the range of 0.5 to 50 percent.

10. The electrochemical cell of claim 9,
wherein mole fraction of said additive metal in the +4 valence state relative to total metal in said oxide coating is at least 1 percent.

11. The electrochemical cell of claim 10, wherein said cell is a bipolar cell and incorporates a plurality of bipolar electrodes having surfaces.

12. The electrochemical cell of claim 11, further provided with means to improve mass transfer at said surfaces of said bipolar electrodes.

13. The electrochemical cell of claim 12, wherein mole fraction of said additive metal in the +4 valence state relative to total metal in said oxide coating is in the range 2 to 6 percent.

14. The electrochemical cell of claim 13, wherein coat weight of said oxide coating is at least 0.5 milligrams per square centimeter.

15. The electrochemical cell of claim 10, including
(a) at least one porous anode, and
(b) at least one permeable cathode, and
(c) wherein said porous anodes and said permeable cathodes are assembled in an array, and
(d) wherein said electrochemical cell is further provided with means to prevent direct electrical contact of said porous anodes with said permeable cathodes, and
(e) wherein means are provided to cause an aqueous medium to flow through said porous anodes and said permeable cathodes.

* * * * *